United States Patent [19]

Blazo

[11] Patent Number: 5,754,437
[45] Date of Patent: May 19, 1998

[54] PHASE MEASUREMENT APPARATUS AND METHOD

[75] Inventor: Stephen F. Blazo, Portland, Oreg.

[73] Assignee: Tektronix, Inc., Wilsonville, Oreg.

[21] Appl. No.: 711,837

[22] Filed: Sep. 10, 1996

[51] Int. Cl.$^6$ .................... H04L 7/00; H04L 25/36
[52] U.S. Cl. .................. 364/484; 364/724.1; 364/487; 375/371; 375/373; 375/376; 375/375; 327/156; 327/159; 370/516; 315/226
[58] Field of Search .................. 364/484, 487, 364/724.1; 375/371, 373, 375, 376, 226; 331/11, 25, 27, 16, 176; 327/156, 159, 3, 12; 370/503, 516

[56] References Cited

U.S. PATENT DOCUMENTS

| | | | |
|---|---|---|---|
| 4,718,074 | 1/1988 | Mannas et al. | 375/118 |
| 4,811,359 | 3/1989 | Nakajima et al. | 375/10 |
| 5,010,403 | 4/1991 | Wardzala | 358/139 |
| 5,012,494 | 4/1991 | Lai et al. | 375/120 |
| 5,036,249 | 7/1991 | McCaslin | 375/376 |
| 5,241,285 | 8/1993 | Jackson | 331/27 |
| 5,373,255 | 12/1994 | Bray et al. | 331/17 |
| 5,402,443 | 3/1995 | Wong | 375/10 |
| 5,406,592 | 4/1995 | Baumert | 375/376 |
| 5,425,060 | 6/1995 | Roberts et al. | 375/371 |
| 5,493,243 | 2/1996 | Ghoshal | 327/158 |
| 5,506,627 | 4/1996 | Ciardi | 348/515 |
| 5,517,685 | 5/1996 | Aoyama et al. | 455/260 |
| 5,579,351 | 11/1996 | Kim | 375/371 |
| 5,608,761 | 3/1997 | Opas et al. | 375/296 |

OTHER PUBLICATIONS

"Broadcast Quality Video Over SDH Networks; Eradicating Sub Carrier Corruption Due To pointers," J.A. Shields et al., IBC 95 Intl. Broadcasting Convention Pub. No. 413, pp. 269-273, Sep. 1995, IEEE, London, U.K.

"Automate Your Field Testing with the CTS 750 SDH Test Set," Tektronix, Inc., Pub. No. 2GW-9139-0, 1993, Beaverton, Oregon.

"SDH/SONET Telecommunications Standards Primer," Tektronix, Inc., Pub. No. 3SW-8085-1, 1994, Beaverton, Oregon.

"PM6431 E1XC Features, Applications, Receiver Section, and Transmit Section" by PMC-Sierra, Inc., http://www.pmc-sierra.bc.ca/apdh/e1xc.html., Jan. 24, 1997.

(List continued on next page.)

Primary Examiner—James P. Trammell
Assistant Examiner—Cuong H. Nguyen
Attorney, Agent, or Firm—William K. Bucher

[57] ABSTRACT

A phase measurement apparatus and method for measuring electrical signal jitter and wander operates in real time and. digitally controls bandwidths over which the measurements are performed. The apparatus includes a digital phase-lock loop (PLL) for generating phase difference signal data having first and second frequency components above and below the loop bandwidth of the phase locked loop. An analog-to-digital converter digitizes the analog phase difference signal from the phase detector. A digital signal processor (DSP) receives the digital data and performs a loop filter function for generating frequency update values to the DDS for phase locking the PLL to an incoming signal. The DSP performs an integration function on the loop filter function output to generate the second frequency components. The first and second frequency components are combined in a summing circuit and filtered in digitally programmable low and high pass filters for establishing measurement bands for measuring the phase difference. A measurement processor measures peak-to-peak minimum and maximum values and generates RMS values of the phase difference signal over a selected time interval and generating an output in unit intervals for jitter and time for wander. The DSP further includes low and high pass filter functions and an accumulator for summing filtered second frequency components to generate wander data. The DSP processes the frequency update values to generate frequency drift data.

111 Claims, 7 Drawing Sheets

OTHER PUBLICATIONS

"Communication Integrated Circuits–ISDN Data Access/ Digital Terminal ICs Data Communication ICs Wireless Communication ICs Exchange ICs PRI/Switching ICs ISDN Data", http://www.allianet.com/siemens/Catalog/01.html., 1996.

Mark Haas, "Modulation Domain Analysis –A New Method for Measuring Jitter on Digital Devices" by Tom Carrico of HP Co., http://www.haas.com/doc/jitter.htm.

"DSP CARD 4 User Manual and Application Software", http://www.daisy.cheque.uq.edu.au/vk4yeq/DSP$/manual/manual.html, and http://www.trap.org/dsp/dsp4/application.html., Apr. 1995.

PHASE MEASUREMENT APPARATUS AND METHOD

TECHNICAL FIELD

This invention relates to electrical signal measurements and more particularly to an apparatus and method for measuring phase jitter and frequency wander in electrical signals conveyed through a wide-bandwidth telecommunications network.

BACKGROUND OF THE INVENTION

Telecommunications networks have evolved dramatically during the 20th. century to the point where they include worldwide satellite, microwave, and fiber-optic links for transporting data and video services in addition to voice. Starting with analog Plain Old Telephone Service (POTS), the telecommunications industry moved into asynchronous digital systems in the 1950's. The digital systems'hierarchy use digital signals, labeled DS as the building blocks. The fundamental rate is DS0, which is a single voice channel at 64 Kilobytes per second (Kbps). A DS 1 has 24 voice channels plus house keeping bits equaling 1.544 Megabytes per sec (Mbps). Table 1 below shows the levels and bit rates for established DSs:

TABLE 1

| DS | Bit Rate |
| --- | --- |
| DS0 | 64 Kbps |
| DS1 | 1.544 Mbps |
| DS1C | 3.152 Mbps |
| DS2 | 6.312 Mbps |
| DS3 | 44.736 Mbps |
| DS4E | 139.264 Mbps |
| DS4 | 274.176 Mbps |

The European Conference of Postal and Telecommunications Administration (CEPT) adapted an equivalent asynchronous digital standard, called Pleisochronous Digital Hierarchy (PDH), with rates shown in Table 2:

TABLE 2

| E | Bit Rate |
| --- | --- |
| E1 | 2.048 Mbps |
| E2 | 8.448 Mbps |
| E3 | 34.368 Mbps |
| E4 | 139.263 Mbps |

The growth in fiber-optic network links has been particularly rapid since the 1970's and has contributed to a dramatic improvement in network reliability, bandwidth, and quality.

However, the first generations of fiber-optic telecommunications systems relied on proprietary architectures, equipment, line codes, multiplexing formats, and maintenance procedures. The providers of these systems wanted standards so they could mix and match equipment from a variety of suppliers. Accordingly, in the late 1980's, the Exchange Carriers Standards Association and the International Telegraph and Telephone Consultative Committee developed a single international standard referred to as the Synchronous Digital Hierarchy (SDH).

SDH is a fiber-optic data transport system that establishes a wideband transmission technology for worldwide telecommunications networks. The Synchronous Optical Network (SONET) is its implementation in the United States. The comprehensive SDH/SONET standard is expected to provide the transport infrastructure for worldwide telecommunications well into the 21st. century.

SDH/SONET has the same ease of use as the conventional telephone network system; however, its improved configuration flexibility and bandwidth provide significant advantages over the current system. These include the ability to multiplex voice, data, and video signals into a broadband synchronous channel in which individual data bytes can be easily and uniquely identified; reduced equipment requirements; increased network reliability; and a provision for overhead and payload bytes in which the overhead bytes permit management of the payload bytes.

SDH/ISONET employs a byte interleaved multiplexing scheme for conveying multiple signals of differing capacities through a synchronous, flexible, optical hierarchy. Byte interleaving simplifies multiplexing and provides an end-to-end network management capability. The SDH/SONET multiplexing process first employs the generation of a lowest level or base signal that is referred to as the Synchronous Transport Signal level-1 (STS-1), which operates at 51.84 megabytes per second (Mbps). Higher level signals (STS-N) are integer multiples of STS-1, resulting in a family of STS-N signals as shown in Table 3. An STS-N signal includes N byteinterleaved STS-1 signals. Table 3 also shows an optical counterpart for each STS-N signal, designated Optical Carrier level-N (OC-N). In SDH, the base signal is referred to as Synchronous Transport Module level-1 (STM-1), which operates at 155.52 Mbps. Higher level signals (STM-N) are multiples of the base

TABLE 3

| | SDH/SONET Signal Hierarchy | | |
| --- | --- | --- | --- |
| Data Rate (Mbps) | CCITT Designation | Electrical Signal | Optical Signal |
| 51.84 | STM-0 | STS-1 | OC-1 |
| 155.52 | STM-1 | STS-3 | OC-3 |
| 622.08 | STM-4 | STS-12 | OC-12 |
| 2488.32 | STM-16 | STS-48 | OC-48 |

Unlike conventional data transmission systems that derive transmission timing from the bit stream itself, SDH/SONET network elements derive their transmission timing from an external timing reference. More particularly, conventional data transmission systems transmit asynchronously, while SDH/SONET transmits synchronously.

Multiplexing signals in asynchronous timing systems requires storage buffers sufficiently large to store entire frames of information, which introduces significant time delays in the system. In contrast, multiplexing incoming signals in the SDH/SONET synchronous system requires only a few bytes of storage buffer to account for the relatively small timing differences.

However, the overall timing behavior of an SDH network is quite different from conventional Pleisochronous Digital Hierarchy (PDH) networks. In particular, the generation, transmission, accumulation, and impact of timing jitter and wander on data services are fundamentally different. Jitter and wander impacts not only equipment manufacturers and network operators, but also end users, such as television broadcasters, who attempt to use such networks to deliver their signals with the highest quality.

Because the jitter and wander effect in SDH networks is so different, particularly SDH pointer jitter, this also impacts the test equipment used to install, qualify, and maintain hybrid SDH/PDH networks. New jitter and wander measurement methodologies are required because existing methods are no longer suitable and may give unreliable results.

Jitter and wander are defined respectively as the short-term and the long-term variations of the significant instants of a digital signal from their ideal positions in time. For example, a digital signal continually varies in its time position by moving backwards and forwards relative to an ideal clocking source. Jitter and wander on a data signal are equivalent to a phase modulation of a clock signal used to generate the data.

Jitter and wander have both an amplitude—how much the signal is shifting in phase—and a frequency—how quickly the signal is shifting in phase. The standards define frequency variations changing at a rate above 10 Hertz as jitter and phase variations changing at a rate below 10 Hertz as wander. Amplitude is specified in unit intervals (UI), such that one UI of jitter is one data bit-width, irrespective of the data rate. Jitter amplitude is normally quantified as a peak-to-peak value rather than an RMS value because it is peak jitter that causes bit errors in network equipment.

Jitter measurements are made relative to a reference clock. By definition, a signal has no jitter when referenced to itself. Therefore, jitter and wander are measured as a phase or frequency difference between the signal being measured and the reference clock.

Excessive jitter and wander cause several problems including logical errors caused by decision circuits not operating at an optimum time; lost data caused by input buffers being either empty or overflowing, causing framing slips, data loss, or data repetition; and degradation in the reconstruction of encoded analog signals. The latter problem is not normally a problem for voice transmissions, but causes significant degradation of digitized television signals, which require high phase stability to convey color information.

Within a SDH/PDH network, many different mechanisms generate, transfer, and transform jitter and wander. In particular, at SDH cross connect, analog-to-digital, and terminating multiplexer nodes, SDH pointer jitter becomes a potentially serious problem. The pointer mechanism in SDH compensates for frequency and/or phase differences between incoming payloads and outgoing frames at such nodes. For example, even though separate SDH networks are synchronized from the same clock, when a payload is cross connected to a different SDH network, temperature variations cause changes in cable propagation delay that result in wander on the line and the clock. In addition, incoming payloads are typically not in phase with either each other or the outgoing SDH frames.

SDH pointers allow the payload to "float" within the SDH frame structure by introducing a step-change in payload phase, either advancing or retarding the payload by up to three bytes relative to the SDH frame. Such pointer movements can introduce significant amounts of jitter into the payload because they can insert a single block of 24 bits of phase justification into a signal, thereby causing a jitter impulse.

Measuring such jitter is difficult because existing jitter measurement instruments have nonideal responses below the typical 10 Hertz jitter/wander demarcation frequency. This is not an issue in conventional PDH networks. However, in SDH/PDH networks, jitter measurement response variations below 10 Hertz can significantly degrade measurement accuracy.

FIG. 1 shows a prior jitter measurement circuit employing a phase-lock loop (PLL) 10 that includes a phase detector 12, a loop filter 14, a voltage controlled oscillator (VCO) 16, and a frequency divider 18 to measure jitter on a data input signal conditioned by a clock recovery and prescaler 20.

PLL 10 can be used to measure jitter at frequencies as low as the loop bandwidth. If the loop bandwidth is very low, as in certain video measurements, PLL 10 may become unstable. Unfortunately, the amount of jitter measurable, even at low frequencies, cannot exceed the dynamic range of phase detector 12 times the divide ratio used by prescaler 20. The loop bandwidth determines the high pass characteristic of the jitter measurement and is difficult to control because it is strongly influenced by the gain of VCO 16, which is difficult to control.

FIG. 2 shows a prior wander measurement circuit 22 employing phase detector 12 to compare the phase of the data input signal conditioned by clock recovery and prescaler 20 with a reference signal generated by, for example, a reference clock 24 that synchronizes a direct digital synthesizer (DDS) 26. The wander measurement range is limited by the dynamic range of phase detector 12 and the divide ratio used by prescaler 20. If a large divide ratio is used, the wander measurement loses resolution.

Another disadvantage of prior jitter and wander measuring systems relates to their typically analog implementation. A wide variety of signal rates, types, formats, and standards requires jitter and wander measurements. Prior analog measuring systems typically measure only jitter or wander and require using different sets of prescalers, PLLs, and loop filters to measure a particular signal rate, type, format, or standard.

U.S. patent application Ser. No. 08/576,422, filed Dec. 21, 1995 and assigned to the assignees of the present invention, describes a jitter and wander measurement apparatus that measures highband jitter in one path and lowband jitter and wander in a second path. The apparatus has a digitally controlled phase-locked loop that includes a phase detector, an analog-to-digital converter, a digital signal processor, and a direct digital synthesizer. The phase detector generates a phase difference signal between a clock input derived from the input signal and a second signal generated by the direct digital synthesizer. The phase difference signal is digitized and coupled to the digital signal processor and high and low pass filter banks. The digital signal processor performs a second order loop filter function on the digital data for generating frequency update values to the direct digital synthesizer for locking the input clock signal to the direct digital synthesizer output. The digital signal processor further performs an integration function on the loop filter data for generating low frequency phase data, which is further processed and filtered to generate low pass jitter, called subband jitter, and wander measurements. The digital signal processor also set the loop filter bandwidth as a function of the measurements being performed. The digitized phase data coupled to the high and low pass filter bands is filtered and coupled to a measurement processor for generating high pass jitter measurements. One drawback to this implementation is the dual measurement channel for low and high pass jitter measurements. Further, the loop bandwidth of the phase locked loop is used as the low pass filter cutoff for subband measurements. Also the high pass measurement is dependent on the phase-locked loop bandwidth which changes as a function of the measurements being made and the frequency of the input signal. This requires that the loop bandwidth be calibrated for every measurement made using the loop filter.

What is needed, therefore, is a unified jitter and wander measurement system and method that measures the wide variety of signal rates, types, formats, and standards with a single programmably reconfigurable apparatus. Moreover, the jitter and wander measurements should be stable and accurate and cover an increased measurement frequency range. Also, the jitter and wander measurement system and method should be able to perform jitter measurements over a wide range independent of loop bandwidth of the phase locked loop. Further, the jitter and wander measurement apparatus and method should be capable of making jitter measurements from essentially zero Hertz to the limit of the system components in a single data path.

SUMMARY OF THE INVENTION

An object of the present invention is, therefore, to provide an apparatus and method for measuring phase difference on an electrical signal over a wide range from essentially zero hertz.

Another object of this invention is to provide an apparatus and a method for measuring jitter and wander on electrical signals.

A further object of this invention is to provide an apparatus and a method for measuring jitter and wander on a wide variety of signal rates, types, formats, and standards.

Still another object of this invention is to provide a single programmably reconfigurable apparatus for meeting the above-described objects.

Still a further object of this invention is to provide an apparatus and method that provides stable and accurate jitter and wander measurements over an increased and adjustable measurement frequency range.

In a preferred embodiment, a phase measurement apparatus for measuring electrical signal jitter and wander operates in real time and digitally controls multiple bandwidths over which the measurements are performed. A phase-locked loop (PLL) includes a phase detector, a low pass filter (LPF), an analog-to-digital converter (ADC), a digital signal processor (DSP), a direct digital synthesizer (DDS), and a tracking oscillator followed by a prescaler. The phase detector receives an input signal that is compared with a signal derived from the DDS. The phase detector output signal contains jitter and wander data with the phase difference signal having first frequency components representing the phase difference above the loop bandwidth of the phase-locked-loop. The phase difference signal is filtered and digitized by the ADC. The DSP receives the phase difference signal data from the ADC and performs a proportional integral loop filter function on the data for producing frequency update values. The frequency update values are coupled to the DDS for locking the PLL by updating a phase accumulation register in the DDS. The DDS generates a clock signal at a precise rate determined by the phase accumulation registers. The tracking oscillator locks to a harmonic of the DDS frequency to increase the resolution of the phase measurement. A master reference clock controls the PLL with a stability and accuracy sufficient to measure low frequency wander. The DSP further performs an integration function on results of the loop filter function for producing second frequency components of the phase difference signal below the loop bandwidth of the phase-locked-loop. The phase difference signal data from the analog-to-digital converter representing the first frequency components above the loop bandwidth of the PLL and the processed phase difference signal data from the digital signal processor representing the second frequency components below the loop bandwidth of the PLL are combined in a summing circuit. The combined signal from the summing circuit is coupled to a measurement circuit for measuring the phase difference on the first signal.

In one implementation of the present invention the measurement circuit includes digitally programmable low and high pass filters that set low and high pass filter breakpoints for measuring the phase difference on the first signal in various frequency bands, such as wander in a wander band and jitter in one of at least subband, wideband, fullband and highband. The filtered phase difference signal data is coupled to a processor for storing minimum and maximum peak-to-peak and RMS values of the phase difference signal data over the selected measurement band for measuring jitter, and phase difference values over time of the second frequency components for measuring wander. A generating means calculates the jitter in unit intervals and wander in time increments. The frequency updates to the DDS are also differentiated and filtered for producing frequency drift measurements.

In a further implementation of the present invention the measurement circuit includes the digital signal processor executing low and high pass filter functions on the processed phase difference signal data representing the second frequency components of the phase difference signal and an accumulator for storing filtered phase difference values over time of the second frequency components for the wander data. The filtered integrated second frequency components of the phase difference signal data from the DSP are combined in the summing circuit with the first frequency components of the phase difference signal data from the ADC, which is low passed filtered in a digitally programmable low pass filter. The output of the summing circuit is high pass filtered in a digitally programmable high pass filter and coupled to the processor for storing the minimum and maximum peak-to-peak and RMS values of the phase difference signal data over the selected jitter bands.

The method of measuring the phase difference on a first signal includes receiving the first signal and generating a second signal having a second frequency with a digitally controlled frequency source being a part of a phase-locked-loop having a loop bandwidth. A phase detector produces a phase signal indicative of a phase difference between the first and second frequencies with the phase difference signal having first frequency components representing the phase difference above the loop bandwidth of the phase-locked-loop. The phase difference signal is digitized and processed to produce frequency updates for providing frequency correction data to the digitally controlled frequency source such that the first and second frequencies are in a phase-locked condition and second frequency components below the loop bandwidth of the phase-locked-loop. The phase difference signal data representing the first frequency components above the loop bandwidth and the processed second frequency components below the loop bandwidth are combined and processed to measure the phase difference on the first signal.

The method further includes the steps of implementing selected frequency bands for measuring the phase difference, and measuring the peak-to-peak and RMS phase difference data amplitude for at least one of an amount of jitter and measuring filtered phase difference values over time of the second frequency components for an amount of wander.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 1:
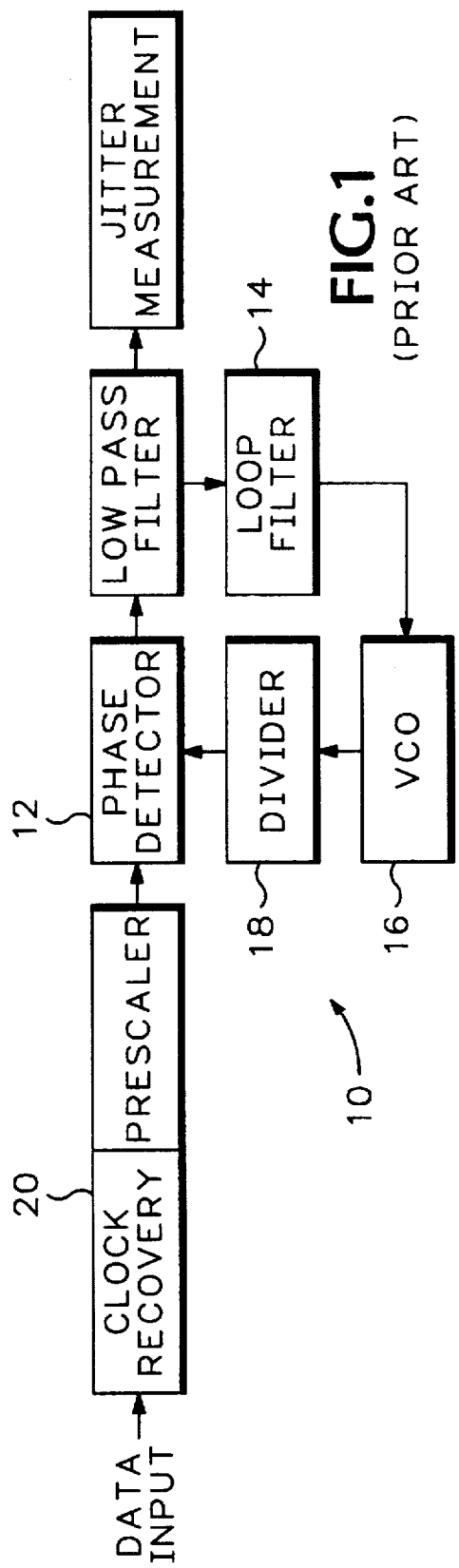
FIG. 1 is a schematic block circuit diagram of a prior art jitter measurement system employing a PLL to measure phase jitter in an electrical signal.
Figure 2:
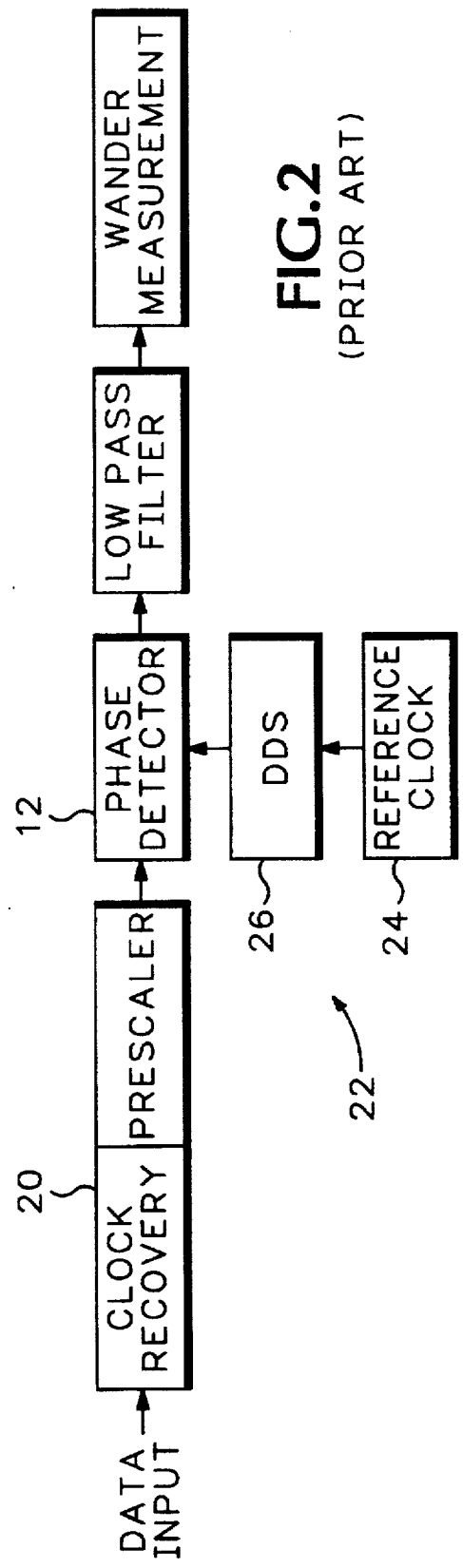
FIG. 2 is a schematic block circuit diagram of a prior art wander measurement system employing a phase detector to measure phase changes between a reference clock and an electrical signal.
Figure 3:
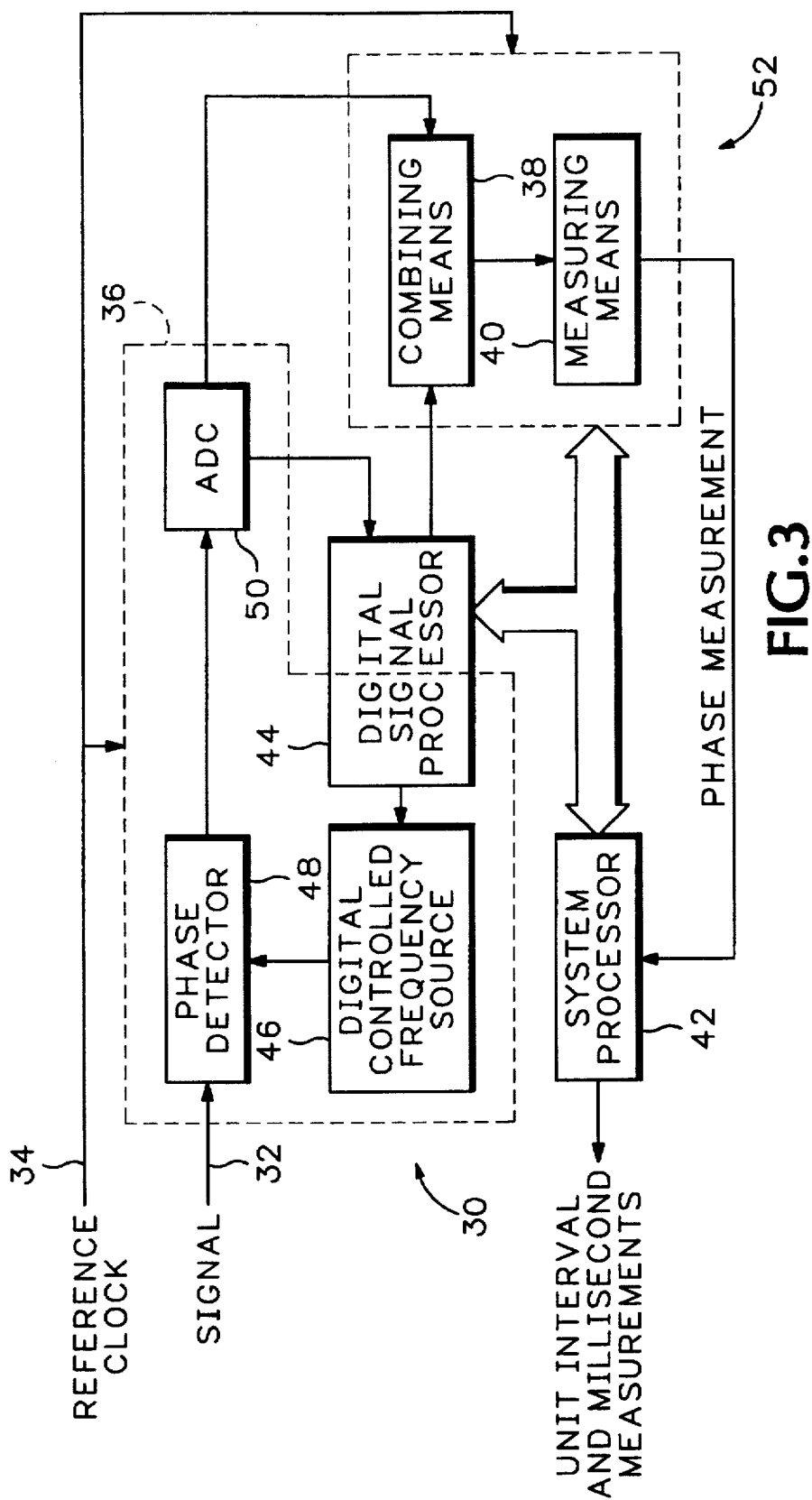
FIG. 3 is a function block diagram of the phase measurement apparatus according to the present invention.

FIG. 3 shows a functional block diagram of the phase measuring apparatus 30 of the present invention. A major application for apparatus 30 is measuring phase difference between a clock within a digital input signal 32, such as DS, E, and SDH/SONET telecommunications signals and a reference signal. Incoming signal formats, rates, and ranges supported by apparatus 30 preferably include a wide-range of signaling formats employed by electrical and electro-optical systems, such as nonreturn-to-zero, return-to-zero, code-mark-inversion, alternate-mark-inversion, and conventional clock signals having signaling rates up to at least about 2.5 Gigabits per second. The phase difference error on the input signal is measured in frequency bands, such as a wander band and at least one of number of jitter bands called subband, wideband, fullband, and highband. The frequency bands over which the phase difference error measurements are made are not limited to these specific bands and other frequency bands may be used within the scope of the invention. The phase difference error is reported to a user in the terms of unit intervals for jitter and time for wander.

A reference clock 34, such as a cesium atomic clock preferably having a Stratum-1 rating to support jitter and wander measurements or a Stratum-3 rating if only jitter measurements are required, controls the timing and synchronization function of the phase measuring apparatus 30. The reference clock 34 is coupled to a phase-locked-loop (PLL) 36, a combining means 38, and a measuring means 40. The PLL 36 includes a digital signal processor (DSP) 44, a digitally controlledfrequency source (DCFS) 46, a phase detector 48, and an analog-to-digital converter (ADC) 50. The combining and measuring means 38 and 40 may be implemented in a field-programmable gate array (FPGA), such as a Xilinx 4006 or a Altera FLEX 8000 series FPGA or a combination of a FPGA, discrete digital filters, and other elements 52 to be described in greater detail below. A system processor 42 is coupled to the PLL 36, the combining means 38, and the measuring means 40. The phase measuring apparatus 30 is preferably implemented as an optional plug-in device to models CTS 710 and CTS 750 SONET and SDH Test Sets that are manufactured by the assignee of this application.

PLL 36 receives the input signal 32 at phase detector 48. The digitally controlled frequency source 46 in response to the reference clock 34 and an input from the DSP 44 generates a second signal having a second frequency, which is coupled to the phase detector 48. The phase detector 48 generates a phase difference signal proportional to the phase difference between the input signal 32 and the signal from the DCFS 46. The ADC 50 receives the phase difference signal and generates digital phase difference signal data having first frequency components above the loop bandwidth of the PLL 36. The DSP 44 and the combining means 38 receive the phase difference signal data from the ADC 50. The DSP 44 processes the phase difference signal data for providing frequency control data to the DCFS 46 to phase lock the DCFS 46 output signal to the input signal 32. The DSP 44 performs an integration function on the frequency control data to produce phase difference signal data representing second frequency components below the loop bandwidth of the PLL 36, which is coupled to the combining means 38. The combining means receives the integrated phase difference signal data below the loop bandwidth from the DSP 44 and the phase difference signal data above the loop bandwidth from the ADC 50 and preferably sums the inputs to generate an output containing the phase difference error on the input signal. The measuring means 40 receives the combined phase difference signal data, filters the data as a function of the band being measured and measures the phase difference on the input signal in that band. The phase difference measured by the measuring means 40 is coupled to the system processor 42 for conversion into unit intervals for jitter measurements and seconds or parts of seconds for wander measurements. The unit interval jitter measurements and the time wander measurements are coupled to a display processor (not shown) for display. The use of a very accurate reference clock 34 in combination with a digitally controlled frequency source 46 in the phase-locked-loop 36 and a combining means 38 for summing the phase difference signal data from above and below the loop bandwidth of the PLL 36 provides a phase difference error measuring apparatus 30 having extremely accurate measurement capabilities down to zero Hertz.

Figure 4A:
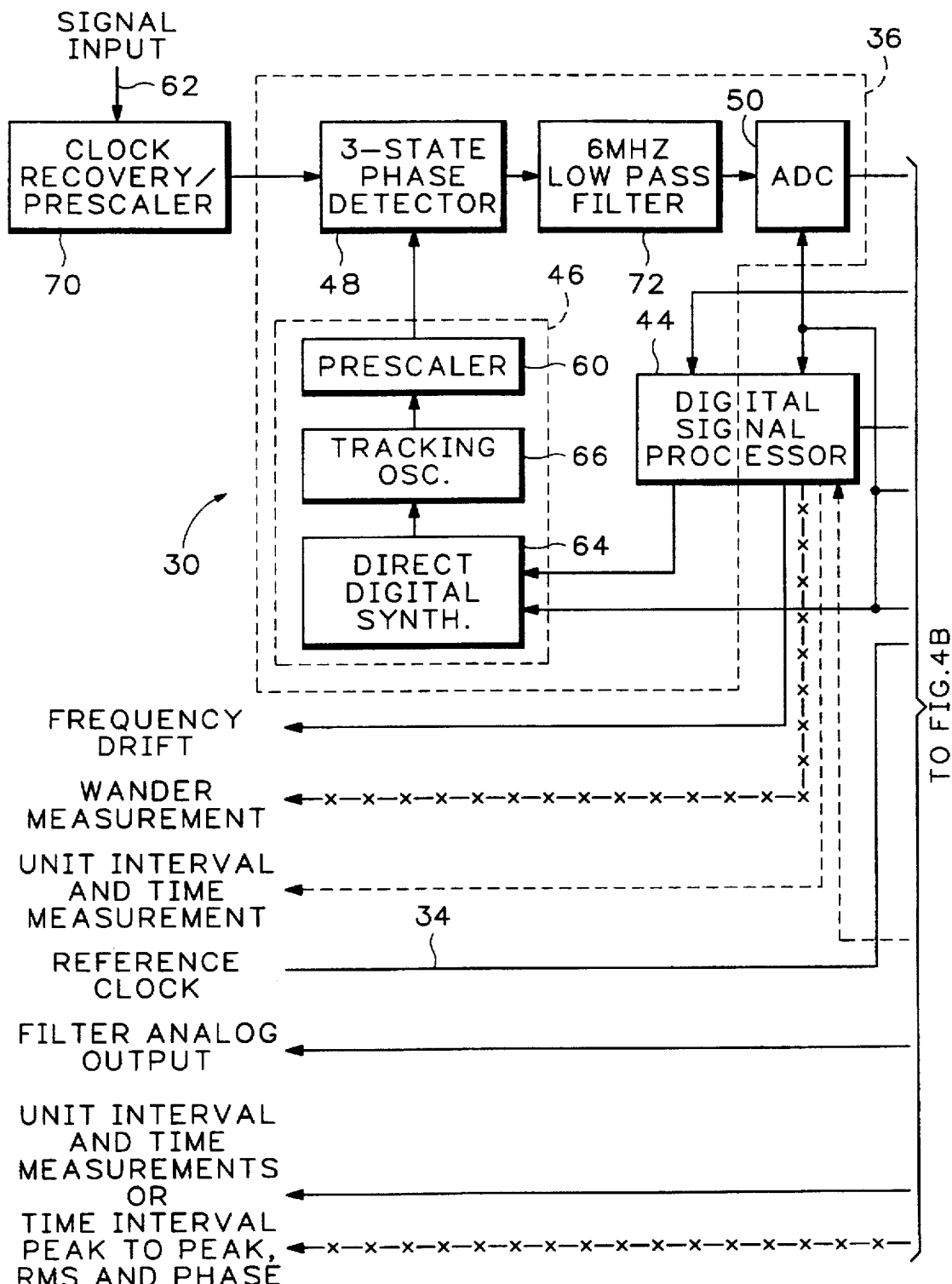
FIG. 4 is a schematic block diagram of the phase measurement apparatus for measuring jitter and wander employing a digital PLL, digital filters, and a DSP according to the present invention.
Figure 4B:
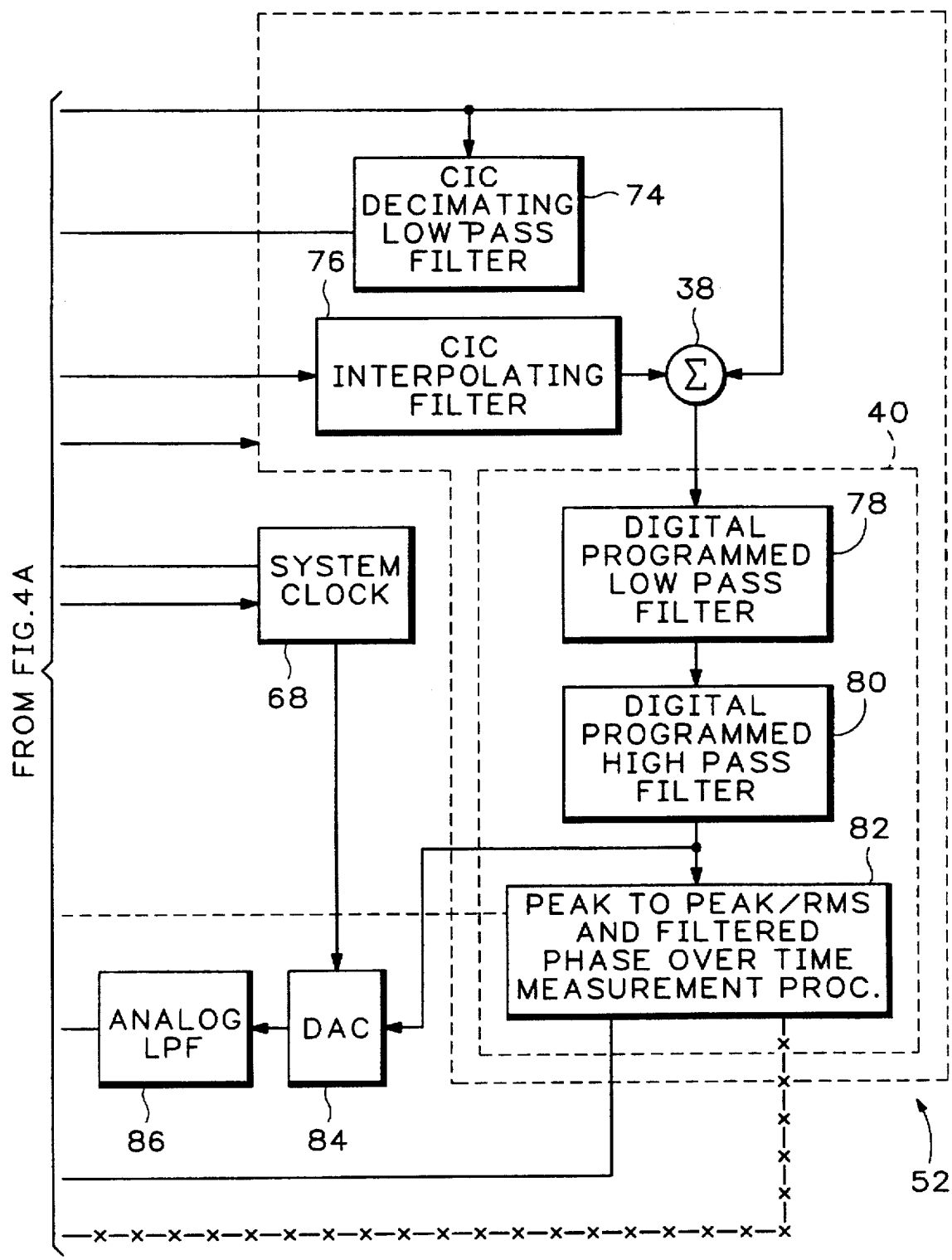

FIG. 4 shows a first implementation of the phase measuring apparatus 30 of the present invention for measuring jitter and wander on a first signal having a first frequency. The jitter and wander measuring apparatus (JAWA) 30 of this invention employs DSP 44 controlling PLL 36 to phase-lock a signal received from a prescaler 60 to a clock recovered and optionally prescaled from an incoming signal 62. The loop bandwidth of PLL 36 is controllable by DSP 44. Incoming signal phase jitter above the loop bandwidth appears as a phase difference between the signal from prescaler 60 and the recovered clock and is referred to hereafter as first frequency components of the phase difference signal. Phase jitter below the loop bandwidth appears as an integral of the frequency adjustments required to adjust the DDS 64 frequency of the digitally controlled frequency source 46 and is referred to hereafter as second frequency components of the phase difference signal. The DDS 64 frequency is suitably multiplied by a tracking oscillator 66 and prescaler 60 to phase-lock PLL 36 to the incoming signal frequency.

A system clock 68 generates a 25.92 MHz signal that controls the timing and synchronizing functions in JAWA 30. To ensure measurement stability and accuracy, system clock 68 is locked to the cesium atomic reference clock 34.

The clock recovery and prescaler circuit 70 recovers a clock signal from an incoming electrical or electro-optical signal, such as a data signal, in a manner that preserves the jitter on the incoming data transitions up to at least a frequency required by the applicable standard. The recovered clock signal is appropriately prescaled for phase comparison with the signal from prescaler 60 by a phase detector 48, which is preferably a Motorola MCK12140 having a ±2π radian dynamic range.

Phase detector 48 is preferably a three-state phase detector that has a linear phase-to-voltage characteristic which allows direct evaluation of phase differences between the recovered and prescaled incoming signal and the prescaler 60 signal. Assuming that the nominal frequencies of the two signals are equal, meaning the PLL 36 is locked, the output signal from the phase detector 48 is almost directly suitable for measuring jitter. More particularly, the output signal is a pulse-width-modulated version of the jitter signal and requires only low pass filtering to extract the jitter signal. Peak jitter measurements are accomplished by determining the maximum amplitude of the filtered output from phase detector 48 over a predetermined time interval.

Tracking oscillator 66 is preferably a Z-Comm voltage-controlled oscillator operating in a frequency range of 400–800 MHz that is locked to a 100th. harmonic of a 4 MHz to 8 MHz signal generated by DDS 64. DDS 64 is preferably an Analog Devices 7008 that is locked to the 25.92 MHz system clock 68 and frequency updated by DSP 44 at a 101.25 KHz rate. Prescaler 60 provides a programmable frequency multiple such that tracking oscillator 66 is suitable for use with all preferred incoming signal rates. To ensure stability, the tracking bandwidth of tracking oscillator 66 is significantly greater, preferably about 20 KHz, than the maximum bandwidth of PLL 36.

The output signal generated by phase detector 48 is filtered by a 6 MHz analog low pass filter (LPF) 72 that anti-aliases the signal for digitizing by the ADC 50 having a 25.92 MHz digitization rate. ADC 50 is preferably an Analog Devices 9050 having 10-bit resolution.

The digitized phase difference data from ADC 50 is coupled to both PLL 36 and the combining means 38 to be described later. The 25.92 MHz digitization rate of the data in PLL 36 is converted to the 101.25 KHz sampling rate of DSP 44 by a 2-stage cascaded decimating interpolator comb low pass (CIC) filter 74. CIC filter 74 preferably has a decimation ratio of 256, and a constant 10 microsecond group delay at the 101.25 KHz sampling rate, which makes it highly suitable for anti aliasing the data prior to processing by DSP 44.

DSP 44, preferably a Motorola 56303, performs proportional integral loop filter, integration and out of lock detection functions for PLL 36 and a frequency drift detection function. Additionally, the DSP 44 may implement low and high pass filter functions. More particularly, DSP 44 receives the filtered digitized phase difference signal data from CIC filter 74 and processes it by mimicking an analog second-order active loop filter by performing the proportional integral loop filter function. DSP 44 utilizes the filtered processed data to update the frequency determining registers of DDS 64. This process occurs on precise submultiple time increments of the 25.92 system clock 68, preferably at a 101.25 KHz updating rate. The loop filter program executed by DSP 44 preferably implements the function represented below by equation 1:

$$DDS(n) - DDS(0) = K_p \cdot ADC_{Net}(n-1) + K_I \cdot \sum_{j=1}^{n-1} ADC_{Net}(j) \quad (1)$$

where n equals the $n^{th}$ time slot determined by the sampling rate. $ADC_{net}$ is ADC 50 values from ±512.

The number of DSP bits required to support the process is determined as follows. ADC 50 provides 10-bit numbers ($ADC_{Net}$ is approximately a signed nine-bit number). The bandwidth of PLL 36 is at least 10 Hertz. Therefore, there are at most 20,000 samples in the summation before the ADC value returns to zero because of a transient. The largest value for $K_p$ is about 2,500. Moreover, in low-bandwidth cases such as this, $K_I$ is always less than 1. Therefore, 24-bit arithmetic is sufficient to support the summation function.

The calculation of $K_p$ and $K_I$ follows standard analog PLL models in which the assumptions and constants used are: DDS 64 sensitivity equals 0.006 Hertz/bit, damping factor equals 5, and phase detector 48 gain depends on the divider ratio of prescaler 60 and the percentage of ADC 50 dynamic range used. In the preferred embodiment, the loop filter for PLL 36 is programmed in a range of about 500 Hertz. Alternately, the loop filter may be programmed to cover a range of bandwidths up to about 2.5 KHz based on design parameters with the preferred range being from about 500 Hertz to about 1 KHz.

Figure 5:
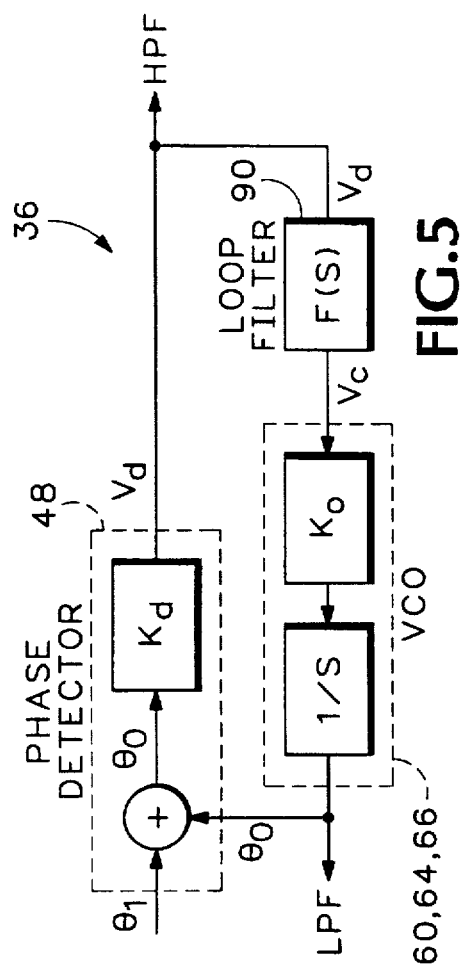
FIG. 5 is a schematic functional block diagram showing a mathematical model of the PLL of this invention.

Because PLL 36 is digitally based and preferably employs digitally implemented filters, integrators, and oscillators, the mathematical basis of these implementations is described below with reference to FIG. 5. PLL 36 is described in terms of its loop bandwidth, which is determined by its open-loop transfer function. The high pass filter (HPF) output signal is derived from the phase error signal $V_d$ that is generated by phase detector 48. The phase detector gain (in volts/radian) is represented by a constant $K_d$, and the VCO gain (in radians/second/volt) is represented by a constant $K_o$. F(s) represents the Laplace transfer function of a loop filter 90.

The closed-loop transfer function $H_{HPF}(s)$ of PLL 36 in a high pass filtering mode is represented below by equation 2.

$$H_{HPF}(s) = \frac{sK_d}{s + K_d K_o F(s)} \quad (2)$$

The corresponding closed-loop transfer function $H_{LPF}(s)$ of PLL 36 in a low pass filtering mode is represented below by equation 3.

$$H_{LPF}(s) = \frac{K_d K_o F(s)}{s + K_d K_o F(s)} \quad (3)$$

Loop filter 90 typically includes a proportional component and an integral component, which results in the transfer function represented below by equation 4.

$$F(s) = \frac{K_1}{s} + K_p \quad (4)$$

Preferably the loop bandwidth of PLL 36 is fixed in the range of 500 Hertz for all input signals and frequency band measurements. However, for the subband jitter measurement frequency band, the loop bandwidth may be used for setting the low pass filter band limit. In the preferred embodiment, the loop bandwidth for subband measurements is set for 1 KHz but the loop bandwidth may be in a range from about 500 Hertz to about 2.5 KHz.

Assuming a desired loop bandwidth $f_{des}$ and a damping factor $\zeta_{des}$ of greater than two, the loop gains are determined by assuming a dominant single pole as represented below by equations 5 and 6:

$$K_P = \frac{2\pi f_{des}}{K_o K_d}, \text{ and} \quad (5)$$

$$K_1 = K_o K_d \left( \frac{K_P}{2\zeta_{des}} \right)^2. \quad (6)$$

Representative system parameters are shown below in Table 4.

TABLE 4

| $K_o$ | $K_d$ | $N_{delay}$ | $F_o$ | $\zeta_{des}$ |
|---|---|---|---|---|
| | 0.2 V/Radian | 2 samples | 101.25 KHz | 5.0 |

The preferred lead controller gains include small adjustments necessary to make the dominant pole approximation exact, meaning that equations 5 and 6 provide the exact proportional and integral gains for the preferred damping factor and corner frequency.

The loop filters are described above in the continuous-time (Laplace) domain. Implementing the loop filters in DSP 44 requires transforming them to the discrete-time, or z, domain. This is accomplished by employing a bilinear transformation with prewarping as represented below by equation 7.

$$s = 2F_s \left( \frac{1-z^{-1}}{1+z^{-1}} \right) \quad (7)$$

Equation 7 maps the imaginary axis of the s plane to the unit circle of the z plane. $F_s$ is the system sample rate, which is preferably 101.25 KHz.

Prewarping ensures that a desired analog frequency ($\Omega_d$) is mapped exactly to its corresponding digital frequency ($\omega_d$) and is required because of the nonlinear frequency mapping between the continuous- and discrete-time domains as represented below by equation 8.

$$\Omega = 2F_s \tan\left( \frac{\omega}{2} \right) \quad (8)$$

The loop filter breakpoint is preferably preserved across both domains, therefore determining the necessary prewarping. Equations 7 and 8 can then be combined into an expression that maps from an analog prototype in the s domain to the digital implementation in the z domain. The combined expression is represented below as equation 9:

$$s = \Omega_1 \cot\left( \frac{\Omega_1}{2F_s} \right) \cdot \left( \frac{1-z^{-1}}{1+z^{-1}} \right), \quad (9)$$

where $\Omega_1$ is the preferred loop bandwidth in radians/second.

The controller transfer function is a second-order IIR filter in the z domain as represented below with generic coefficients by equation 10.

$$F(z) = \frac{b_0 + b_1 z^{-1} + b_2 z^{-2}}{1 + a_1 z^{-1} + a_2 z^{-2}} \quad (10)$$

Actual coefficients are obtained by combining equations 4 and 9 into equation 10. The filter can then be implemented by employing the difference equation represented below by equation 11.

$$y_n = b_0 x_n + b_1 x_{n-1} + b_2 x_{n-2} - a_1 y_{n-1} - a_2 y_{n-2} \quad (11)$$

Referring again to FIG. 5, an integrator is inherent in analog or digital implementations of the VCO functions of PLL 36. However, in a digital implementation, DSP 44 does not have direct access to the low pass filtered PLL signal because it exists only in the analog domain. Therefore, deriving samples of the loop phase from the frequency samples generated by F(z) entails DSP 44 implementing an integration function that mimics the one inherent in DDS 64.

The integrator implementation is based on the expression represented below by equation 12.

$$H_I(s) = \frac{1}{s} \rightarrow H_I(z) = F_s \left( \frac{1}{1-z^{-1}} \right) \quad (12)$$

The calculation of the updated frequency value of DDS 64 from the integrator output is equivalent to a gain stage and can, therefore, be incorporated into the numerator constant shown below in equation 13. DSP 44 then mimics the entire VCO structure including tracking oscillator 66, DDS 64, and prescaler 60. This is referred to in well-known control system terminology as a "plant" , P(z), both domains of which are represented below by equation 13.

$$P(s) = \frac{K_o}{s} \rightarrow P(z) = \frac{K_o F_s}{1-z^{-1}} \quad (13)$$

The loop filter and integration functions may be implemented in a number of different ways in DSP 44. For example, the loop filter function and the function for mimicking of the entire VCO structure can be implement in a parallel process with the loop filter function producing the frequency update values for the DDS 64 and the VCO structure mimicking function producing the second frequency components of the phase difference signal data below the loop bandwidth of the PLL 36. In another implementation, the integration function is performed on the frequency update values as a function of summing the frequency update values and appropriately scaling the results for producing the second frequency components. The appended claims cover the above implementations and other implementations of the loop filter function and the integration function that produce the frequency updates to the DDS 64 and the second frequency components of the phase difference signal data below the loop bandwidth of the PLL 36.

Referring again to FIG. 4, PLL 36 should preferably recover from an out-of-lock condition. Because phase detector 48 responds to the out-of-lock condition by generating a positive or negative limit voltage, DSP 44 can attempt to correct the out-of-lock condition when the phase detector 48 output voltage digitized by ADC 50 exceeds a predetermined positive or negative threshold value. DSP 44 responds by switching the loop filter coefficients to a set corresponding to a wider loop bandwidth and waiting a predetermined amount of time for PLL 36 to lock. If PLL 36 is still out-of-lock after the predetermined time period, DSP 44 responds by switching the loop filter coefficients to another set corresponding to an even wider loop bandwidth. The process repeats until PLL 36 locks.

The integrated frequency control data from the DSP 44 representing the second frequency components of the phase difference below the loop bandwidth of the PLL 36 is interpolated back to 25.92 MHZ rate by passing it through a CIC interpolating filter 74. In the preferred embodiment, the interpolated data is 16-bit data, which is coupled to the combining circuit 38 where it is summed with the 10-bit output data from ADC 50. The combining circuit 38 may be implemented as a digital summing node having an accumulator for adding the outputs of the ADC 50 and the DSP 44 representing the first and second frequency components of the phase difference signal data. Preferably the combining means is implemented in the Xilinx FPGA 52. Each of the corresponding sample points from the DSP 44 and the ADC 50 are summed and passed to the measuring means 40. Errors in combining the first and second frequency components of the phase difference signal data are in the effects of the tracking oscillator 66 and the degree to which delays can be matched in the two signal paths. These errors can be kept quite small. The summed output of the combining circuit represents the phase difference on the first signal from essentially zero Hertz to the frequency limit of the ADC 50.

Figure 6:
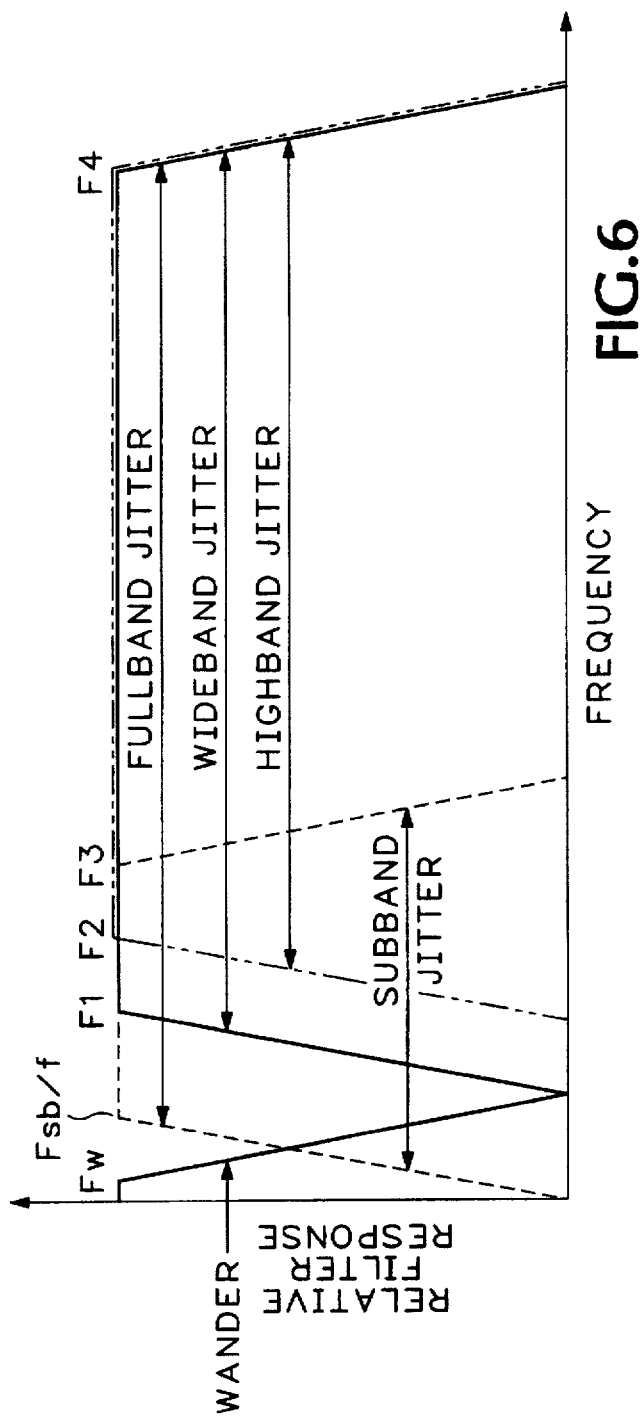
FIG. 6 is a simplified graph showing filter breakpoints and relative filter responses required to perform the various wander and jitter measurements of this invention.

The telecommunications industry continuously sets standards for measuring the phase difference error in transport signals based in part on the data rate. For example, the ITU Standards Committee has proposed a fullband measurement for jitter where the high pass filter breakpoint is set for 10 Hertz regardless of the data rate. For wideband measurements, the standards for the highpass filter breakpoint are set at 10 Hertz for DSI and DS3 data rates and 20 Hertz for El and E2 data rates. The high pass filter breakpoint for E3 is set to 100 Hertz and E4 is set to 200 Hertz. Data rates of 51.84 Mbps, 155.52 Mbps, and 622.08 Mbps have high pass filter breakpoints respectively of 100 Hertz, 500 Hertz, and 1000 Hertz. Examples of low pass breakpoints for the different data rates are: 40 KHz for 1.544 Mbps; 100 KHz for 2.048 Mbps; 400 KHz for 8.488 Mbps, 44.736 Mbps, and 51.84 Mbps; 800 KHz for 34.368 Mbps; 3.5 MHz for 139.264 Mbps; 1.3 MHz for 155.52 MHz; and 5 MHz for 622.08 Mbps. Because of the evolving nature of these standards and the various data rates involved, the phase measurement apparatus 30 incorporates digitally programmable low and high pass filters for implementing the frequency bands for measuring the phase difference error in the transport signal. These filters functionally replace the complex bank of analog filters in prior art phase measurement systems. FIG. 6 shows the relative filter response for the low and high pass filter functions for various measurements bands. The measurements bandwidths are representative in that the measurements bands may vary as a result of changes to the standards or telecommunications providers or measurement test equipment manufacturers defining their own frequency band limits. Wander measurements are performed in over a frequency range from about zero Hertz to about 10 Hertz ($F_w$). Subband measurements are performed over a frequency range from about 0.1 Hertz ($F_{sb}$) to about 1 KHz ($F_3$). Fullband measurements are performed over a range from about 0.1 Hertz ($F_f$) to about 5 MHz ($F_4$). Wideband measurements are performed over a range from about 10 Hertz ($F_1$) to about 5 MHz ($F_4$). High band measurements are performed over a range from about 700 Hertz ($F_2$) to about 5 MHz ($F_4$).

Serially coupled digitally programmable low and high pass filters 78 and 80 receive the summed phase difference error data and implement selected frequency bands for measuring the phase difference. The low and high pass filter 78 and 80 implement low and high pass filter functions based on the measurement being made and the data rate of the input signal 62. The low pass filter function has filter breakpoints that are programmable in a range from about 10 Hertz to about 5 MHz. The high pass filter function has filter breakpoints that are programmable in a range from about 0.1 Hertz to about 250 KHz. The digitally programmable low pass filter is preferably implemented as a two stage filter having a boxcar averaging decimating filter in series with a finite impulse response filter. The boxcar averaging filter performs a divide by two function and is implemented in the Xilinx 4006 field programmable gate array (FPGA) 52. The finite impulse response filter is preferably a Harris HSP 43168 decimating digital filter 52 that receives the output of the boxcar filter. The boxcar filter is used for some data rates, such as DSI and El, where the decimatation in the FIR filter is not sufficient to perform the filtering. In other cases the boxcar filter is bypassed. The digitally programmable high pass filter 80 is preferably implemented in the FPGA 52. The filter breakpoints for the high pass filter 80 may be continuously programmable in a range from about 0.1 Hertz to about 20 Hertz and selectively programmable in a range from 100 Hertz to about 250 KHz. Preferably, the high pass filter function is implemented in a 1-2-5 step sequence in the range from about 0.1 Hertz to about 20 Hertz and selectively programmable in a range from 100 Hertz to about 250 KHz. The high pass filter function breakpoints in the present invention are generally established as a function of the telecommunications industry measurement standards. However, both the low and high pass filter breakpoints are not limited to the specific breakpoints established in the standards and other filter breakpoints may be programmed for establishing measurement bands without departing from the present invention. Filter coefficients for implementing the filter breakpoints are received from the system processor 42 in response to user input selecting a particular data rate and measurement band. Preferably the system processor 42, operating under software control, automatically sets the filter coefficients based on the user selected operating parameters. Alternately, the filter breakpoints may be manually set by the operator for establishing non-standard phase measurement bands.

An alternative digitally programmable low pass filter 78 design is a cascaded two stage decimating digital filter (DDF) using two Harris HSP 43168 decimating digital filters. Each DDF implements a length 16D-1 symmetric finite impulse response ("FIR") filter with an efficient polyphase structure, where D is the decimation ratio. Data and filter coefficients are preferably represented with at least 10 bits of accuracy. FIR filters are symmetric, thereby ensuring a linear phase response.

By cascading the DDFs, a multistage decimation filter is implemented that efficiently provides multiple programmable filters. This is particularly necessary for filtering a 2 Megabit per second incoming signal when prescaler 70 has a division ratio of 10. A general rule for determining the length of an FIR filter is represented below by equation 14.

$$N = \frac{D \infty (S_p, S_t)}{\Delta F/F} \tag{14}$$

The numerator of equation 14 is a function of the passband and stopband ripple specifications, and the denominator is a ratio of the transition band width to the sampling frequency. Multistage decimation is advantageous because each of DDFs may relax its $\Delta F/F$ ratio. In the two-stage cascaded implementation, the first DDF heavily decimates the signal to reduce the sampling rate that the second DDF processes, thereby allowing a proportional reduction in the length of the second DDF as indicated by a decrease of parameter F in equation 14. The first DDF can also be made relatively short because a very wide $\Delta F$ range is allowed.

Multistage filtering is also advantageous when quantized data and coefficients are employed. In the Harris HSP43168 DDF, the 10-bit data representation limits stopbands to about 65 dB of attenuation. By choosing filter characteristics that attenuate offending signals twice, once in each of DDFs, attenuations greater than 70 dB are achieved.

The filtered phase difference signal data is coupled to a measurement processor 82 for measuring an amount of wander or at least one of an amount of jitter. The measurement processor 82 is preferably implemented in the FPGA 52. The measurement processor has an accumulator for storing the peak-to-peak and RMS values of the phase difference signal data over time. In the present invention, the minimum and maximum peak-to-peak values of the phase difference signal data are accumulated over time intervals of 125 milliseconds equivalent to an eight Hertz repetition rate.

The minimum and maximum peak-to-peak values over the 125 millisecond time intervals are concatenated over the time interval of the test and appropriately scaled to generate the unit interval measurement for the test. The scaling factor is a function of the unit interval ranges, which are a function of programming variable dividers in the clock recovery/ prescaler 70 in front of the phase detector 48. A divide by two variable divider would provide a 4 UI range and a divide by 512 would provide a 1024 UI range with any range being programmable. In the preferred embodiment of the invention, data rates, such as DS1, DS3, E1, E3 and the like, and SDH/SONET data rates are supported in 6 and 18 UI ranges. The generalized form for calculating the unit interval is determining the difference between the maximum and minimum peak-to-peak values over the time interval of the test, multiplying the result by the unit interval range, and dividing the result by the sum of the maximum signed minimum and maximum values. As an example, 12-bit signed peak-to-peak values have a maximum peak value of 2048 and a minimum value of −2048 resulting in a summed value of 4096. The maximum and minimum peak values over the time interval are respectively +500 and −300. The unit interval range is 10 UI. The difference in the peak-to-peak values is 800, times the 10 UI range, divided by 4096 resulting in a UI of 1.953.

In RMS mode, the phase difference signal data is constantly being accumulated and an RMS function is performed over the 125 millisecond time intervals. The RMS data for each 125 millisecond time interval is concatenated over the time interval of the test and appropriately scaled to generate the RMS unit interval measurement for the test. In wander mode, the phase difference signal data is summed over time intervals of 20 milliseconds equivalent to a fifty Hertz repetition rate. The summed phase difference signal data for each 20 millisecond time interval is summed together over a time measurement interval and appropriately scaled to generate time interval error, which is essentially the error between the recovered clock from the input signal and the reference clock. Phase wander is measured in a range from about zero milliseconds to ±10 milliseconds and phases jitter is measured in a range from about zero unit intervals to about +250 unit intervals.

Alternatively, the combining means 38 may constantly accumulate and perform the RMS function on the phase difference signal data in the RMS mode. The RMS phase difference data is passed out of the combining means at 125 millisecond time intervals. Likewise, in wander mode, the phase difference signal data may be summed over 20 millisecond intervals for wander data and passed to the digitally programmable low and high pass filters 78 and 80 in the measuring means 40.

The calculated and scaled jitter and wander data is output to a display processor (not shown) for formatting and displaying on a display device, such as a liquid crystal display, cathode ray tube device or the like. The jitter and wander data may also be stored in a memory device, such as a hard or floppy drive, or exported over an appropriate communications link, such as an RS-232 line to an external device, such as a computer or the like.

An alternative embodiment for the measuring means includes coupling the accumulated 125 millisecond peak-to-peak and RMS data and the accumulated 20 millisecond phase difference data to over time to the DSP 44 for calculating the jitter unit intervals and the wander times. The DSP 44 would include an accumulator for storing the incoming data and a state machine for concatenating and generating the unit interval and time data. The unit interval jitter data and the wander time data would be coupled to the display processor for display.

The preferred implementation of the measuring means includes the accumulated 125 millisecond peak-to-peak and RMS data and the accumulated 20 millisecond phase difference data to over time to the system processor 42 for calculating the jitter unit intervals and the wander times. The system processor 42 operating under program control would receive the incoming data for concatenating and generating the unit interval and time data. The unit interval jitter data and the wander time data would be coupled to the display processor for display.

The filtered phase difference signal data from the digitally programmable low and high pass filters 78 and 80 also passes to a digital-to analog converter (DAC) 84 for analog reconstruction of the phase difference error signal. DAC 84 converts the digital input at a 25.92 rate. The analog reconstruction of the phase difference signal is reconstructed by an analog low pass filter (LPF) 86.

As voice, data, and video converge over the telecommunication networks, additional measurements are required to meet the standards of the other mediums. For example, NTSC and PAL set rebroadcast standards that specify the rate of frequency drift of the color subcarrier that is measured in a bandwidth from zero to 0.5 Hertz. The color subcarrier within a video payload embedded in a digital transport signal will have a frequency drift that is essentially the frequency drift of the digital transport signal. As previously described, the DSP 44 mimics an analog second-order active loop filter by performing the loop filter function for producing frequency update values, which are utilized for updating the frequency determining registers of DDS 64. The frequency determining samples to the DDS 64 may be differentiated and filtered in DSP 44 at the 0 to 0.5 Hertz bandwidth for generating frequency drift measurements that corresponds to the frequency drift of the color subcarrier. The results can be coupled to the display processor for display or compared against a threshold frequency drift value for generating an alarm condition when the frequency drift line rate exceeds frequency drift standards for video.

DSP 44 may implement low and high pass filter functions for prefiltering the second frequency components of the phase difference signal data below the loop bandwidth of PLL 36 prior to coupling the data to the combining means 38. This in turn, alters the breakpoints of digitally programmable low and high pass filters 78 and 80. The high pass filter function in DSP 44 has breakpoints ranging from about 0.1 Hertz to about 20 Hertz. The high pass filter 80 breakpoints are modified to be programmable in a range from about 100 Hertz to 250 KHz or the high pass filter may be bypassed. The low pass filter function in DSP 44 has breakpoints in a from zero Hertz to about 10 Hertz. The low pass filter 78 breakpoints are modified to be programmable in a range from about 40 to 5 MHz. Further, the DSP 44 may include an accumulator for summing the second frequency components of the phase difference signal data to produce the wander data.

The design and implementation of suitable IIR filters have challenges that stem from finite precision effects, particularly when implemented on a fixed point DSP processor, such as DSP 44. Fortunately, DSP 44 can operate with 48-bit coefficients during arithmetic operations.

The high pass IIR filters are preferably second-order high pass filters. The low order minimizes coefficient quantization problems. The Laplace transfer function for the IIR filters is represented below by equation 15:

$$H(s) = \frac{s^2}{(s-\Omega_1)(s-\Omega_2)}, \quad (15)$$

where $\Omega_n$ is the natural frequency in radians/second.

By employing the bilinear transform described in connection with equation 7, a discrete equivalent of equation 15 is represented below in equation 16.

$$H(z) = \frac{1 - 2z^{-1} + z^{-2}}{1 + b_1 z^{-1} + b_2 z^{-2}}, \quad (16)$$

where $b_n$–s are chosen to achieve the proper -3 dB bandwidth.

Recalling that this filter follows the integrator represented by equation 12, it is evident that the two operations can be combined because a pole and a zero at the origin will cancel. Cascading the two transfer functions results in the function represented below by equation 17.

$$\hat{P}(z)\hat{H}(z) = \frac{K_o F_s (1 - z^{-1})}{1 - b_1 z^{-1} + b_2 z^{-2}} \quad (17)$$

A recursive difference equation corresponding to the cascaded transfer function of equation 17 is represented below by equation 18.

$$y_n = K_o F_s (x_n - x_{n-1}) - b_1 Y_{n-1} - b_2 y_{n-2} \quad (18)$$

Simulations show that the output quantities, y, should be represented with 48-bit accuracy.

To produce wander data the DSP 44 generates samples of phase difference data that have been low pass filtered to 10 Hz and decimated to a 50 Hz rate. The process takes as its input the calculated DDS frequency updates that are calculated at the 101.25 Khz. These samples are added in a block of 2025 which performs a partial filtering of the data and decimates the data to 50 Hz. The resulting samples are low pass filtered to 10 Hz using a FIR (finite impulse response) filter which has integer coefficients. Such a filter will have gain but will not introduce any roundoff error in the results. This is important since the wander data needs to have a long term error of much less than 1 part in $10^{11}$. A corrected frequency reference in then subtracted from each of the samples to correct for any error due to the limited number of bits in the DDS 32 frequency register. The resultant samples are then continuously summed to represent the total phase difference error from the nominal sampled at a 50 Hz rate, which is then the wander data.

Figure 7A:
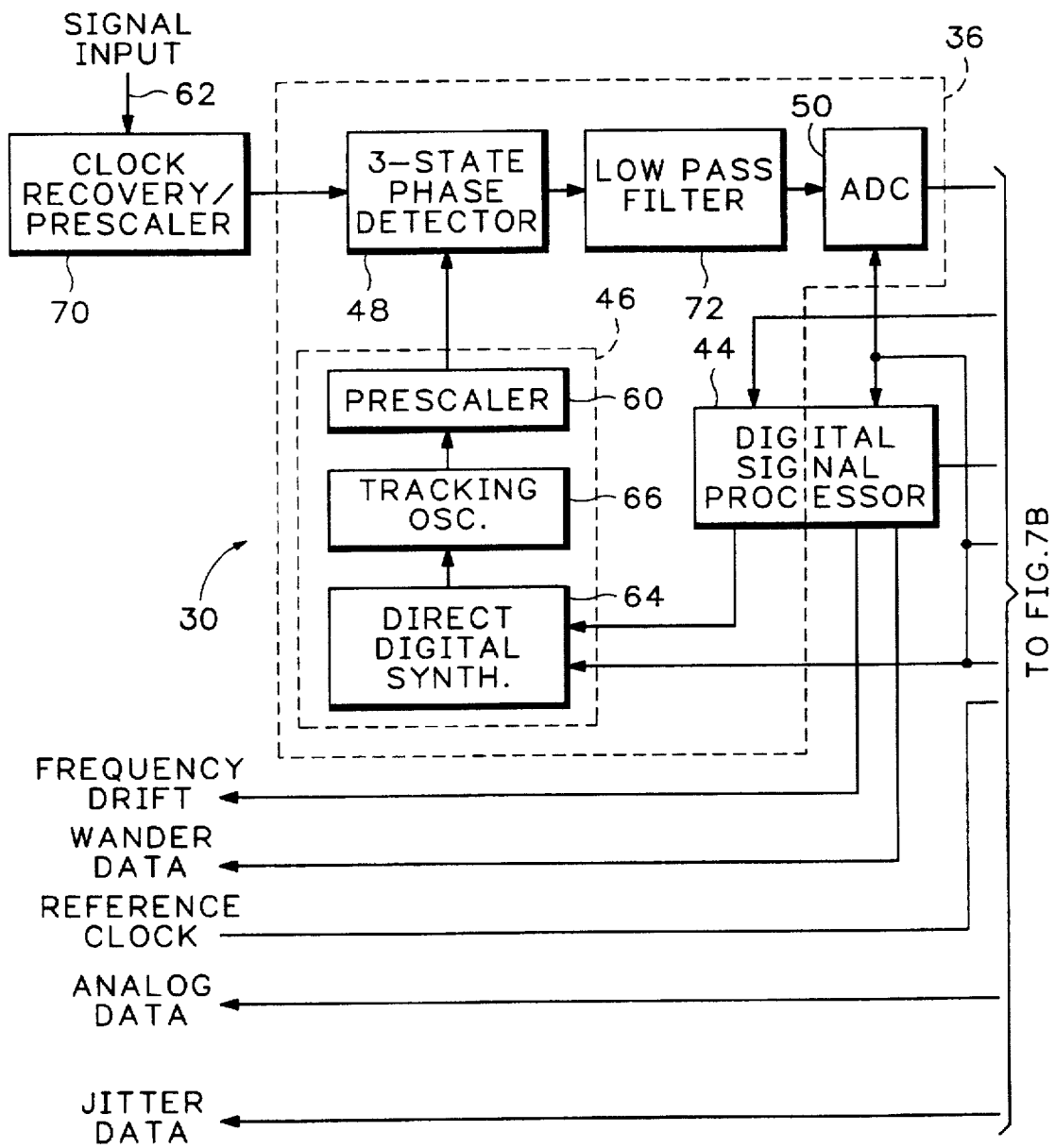
FIG. 7 is a schematic block diagram of the implemented phase measurement apparatus for measuring jitter and wander employing a digital PLL, digital filters, and a DSP according to the present invention.
Figure 7B:
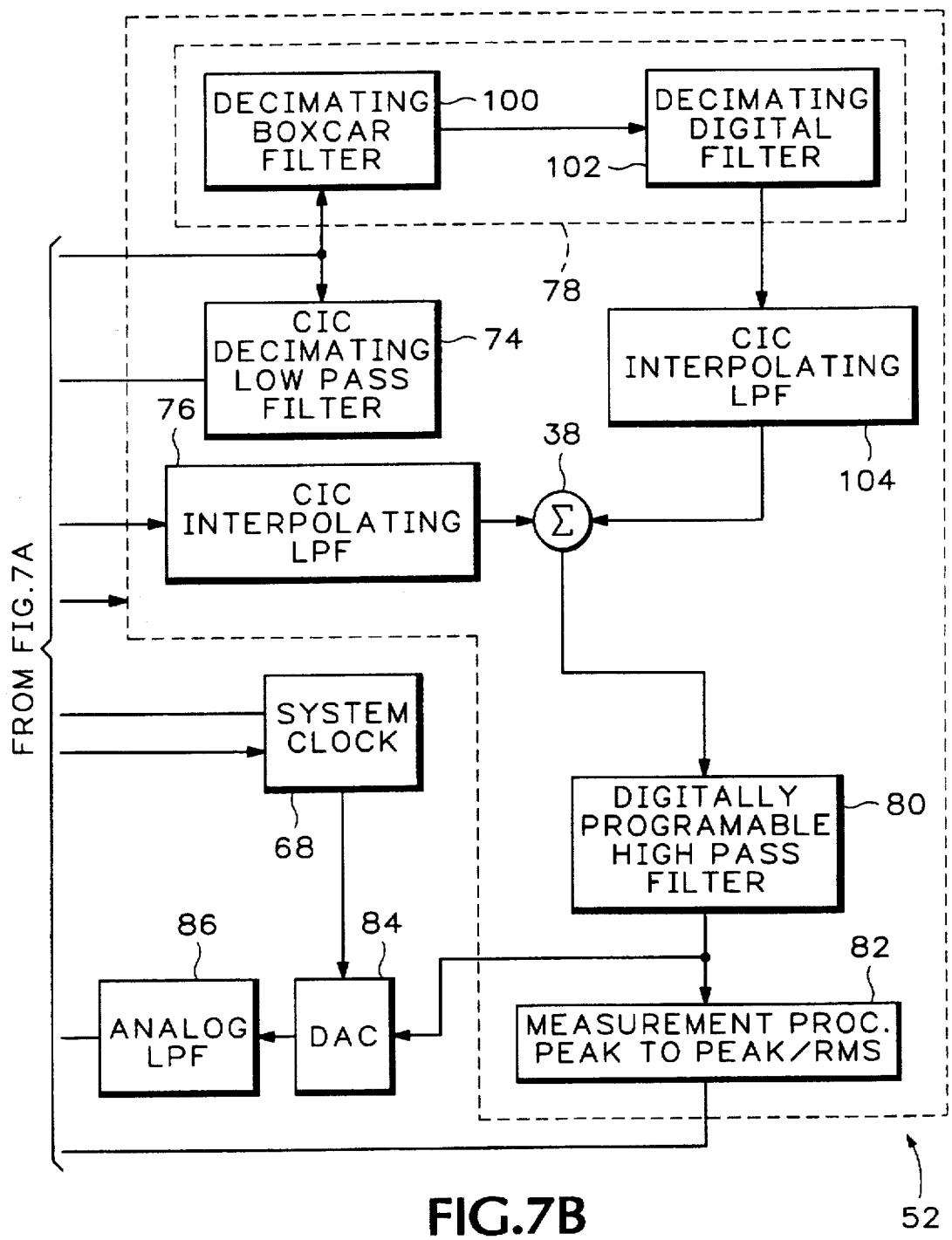

Referring to FIG. 7, there is shown the preferred embodiment of the phase measurement apparatus 30 of the present invention. Like elements from previous drawing are numbered the same. The preferred embodiment includes a phase-locked loop (PLL) 36, digitally programmable low and high pass filters 78 and 80, a combining means 38 in the form of a summation circuit, a measuring means 82 in the form of a measurement processor, and a reference clock in the form of a system clock 68 locked to a reference input clock. The PLL 36 includes a digital signal processor 44, digitally controlled frequency source 46 composed of a direct digital synthesizer 64, a tracking oscillator 66 and a prescaler 60, a phase detector 48, and an analog-to-digital converter 50.

Signal input 62 is coupled to the clock recovery/prescaler 70 that recovers a clock signal from an incoming electrical or electro-optical signal, such as a data signal, in a manner that preserves the jitter on the incoming data transitions up to at least a frequency required by the applicable standard. The recovered clock signal is appropriately prescaled for phase comparison with the signal from the prescaler 60 by the phase detector 48. The phase detector 48 generates a phase difference signal proportional to the phase difference between the input signal 62 and the signal from the prescaler 60. The output signal generated by phase detector 48 is filtered by a 6 MHz analog low pass filter (LPF) 72 and coupled to ADC 50. The ADC 50 receives the phase difference signal and generates digital phase difference signal data having first frequency components above the loop bandwidth of the PLL 36. The ADC 50 digitized output, which is 10-bit data, is coupled to a 2-stage cascaded decimating interpolator comb low pass (CIC) filter 74 and the digitally programmable low pass filter 78. The 25.92 MHz digitization rate of the data in PLL 36 is converted to the 101.25 KHz sampling rate of DSP 44 by filter 74. DSP 44 receives the decimated phase difference signal data from filter 74 and processes it by mimicking an analog second-order active loop filter by performing the proportional integral loop filter function. The loop filter function includes a loop breakpoint that is programmable in a range from about 500 Hertz to about 1 KHz. Preferably, the loop filter is set in a range of about 500 Hertz for all data transport levels and measurement bandwidths. The loop filter bandwidth may be programmed in a range of about 1 KHz for subband measurements. DSP 44 utilizes the filtered processed data to update the frequency determining registers of DDS 64. DDS 64 is locked to the 25.92 MHz system clock 68 and the frequency updated by DSP 44 at a 101.25 KHz rate. Tracking oscillator 66 operates in a frequency range of 400–800 MHz that is locked to a 100th. harmonic of a 4 MHz to 8 MHz signal generated by DDS 64. Prescaler 60 provides a programmable frequency multiple such that tracking oscillator 66 is suitable for use with all preferred incoming signal rates. To ensure stability, the tracking bandwidth of tracking oscillator 66 is significantly greater, preferably about 20 KHz, than the maximum bandwidth of PLL 36.

The DSP 44 performs an integration function on the frequency control data for generating second frequency components of the phase difference signal data below the loop bandwidth of the PLL 36. DSP 44 further executes a low pass filter function on the summed blocks of DDS frequency update values for generating the wander data and a high pass filter function on the second frequency components coupled to the combining means 38. The low pass filter function in DSP 44 includes a breakpoint that is programmable in a range from about 10 Hertz to about 20 Hertz. The high pass filter function includes a breakpoint that is programmable in a range from about 0.1 Hertz to about 20 Hertz. In the preferred implementation, the high pass filter function is programmable in steps of 1-2-5. Alternately, the high pass filter function may be continuously programmable over the 0.1 to 20 Hertz range. The integrated and filtered phase difference signal data below the loop bandwidth of PLL 36, which is 14-bit data, is coupled through CIC interpolating low pass filter 76 to combining means 38 implemented as a digital summing node. Filter 76 interpolates the 101.25 KHz output of the DSP 44 up to the system clock rate of 25.92 MHz.

The 10-bit digitized phase difference signal data from the ADC 50 is input to a divide by 2 decimating boxcar averaging filter 100 in the digitally programmable low pass filter 78. The boxcar filter 100 is preferably implemented in a Xilinx 4006 field programmable gate array (FPGA). The output of the boxcar filter 100 is coupled to a decimating digital filter 102, which is preferably a Harris HSP 43168 decimating digital filter. The digitally programmable low pass filter 78 has a breakpoint that is programmable in a range of about 40 to about 5 MHz. The boxcar filter is used for some data rates, such as DS1 and E1, where the decimatation in the FIR filter is not sufficient to perform the filtering. In other cases the boxcar filter is bypassed. The low pass filter 78 heavily decimates the phase difference signal data at lower signal transport rates, such as DS1, DS3, and the like. The output of the low pass filter is, therefore, passed through a CIC interpolating low pass filter 104 for interpolating the phase difference signal data back to the 25.92 system clock rate. The low pass filtered and interpolated phase difference signal data representing the first frequency components of the phase difference signal data above the loop bandwidth of the PLL 36 from filter 104 is summed with the filtered second frequency components of the phase difference signal data below the loop bandwidth of the PLL 36 from DSP 44 in the summation circuit 38. In peak-to-peak mode, each data pair from the DSP 44 and the low pass filter 78 are summed and passed out to the digitally programmable high pass filter 80. In RMS mode, the data pairs are continually summed and an RMS function performed over a time interval of 125 milliseconds. The RMS results are then passed to the high pass filter 80. Alternately, the peak-to-peak data pairs may be summed and the RMS function performed in measurement processor 82.

The digitally programmable high pass filter implements a high pass filter function having a breakpoint that is programmable in a range from about 100 Hertz to about 250 Khz or bypassed. The combination of the low and high pass filter functions and the loop filter function in the DSP 44 and the low and high pass filter functions of low and high pass filters 78 and 80 establish the various measurement jitter bands for measuring the phase difference error in the input signal 62. Subband measurements are performed over a frequency range from about 0.1 Hertz ($F_{sb}$) to about 1 KHz ($F_3$)as represented in FIG. 6. Fullband measurements are performed over a range from about 0.1 Hertz ($F_f$) to about 5 MHz ($F_4$). Wideband measurements are performed over a range from about 10 Hertz ($F_1$) to about 5 MHz ($F_4$). High band measurements are performed over a range from about 700 Hertz ($F_2$) to about 5 MHz ($F_4$).

The low and high passed digital phase difference signal data is coupled to the measurement processor 82 for measuring the jitter phase within one of the selected measurement bands. The measurement processor 82 is preferably implemented in the FPGA 52. The measurement processor has an accumulator for storing the peak-to-peak and RMS values of the phase difference signal data over time. In the preferred embodiment, the minimum and maximum peak-to-peak values of the phase difference signal data are accumulated over time intervals of 125 milliseconds equivalent to an eight Hertz repetition rate. In the RMS implementation in the measurement processor, the phase difference signal data pairs are continually summed and an RMS function performed over a time interval of 125 milliseconds. The minimum and maximum peak-to-peak values and RMS values over the 125 millisecond time intervals are coupled to the system processor 42 (not shown in FIG. 7) for concatenating over the time interval of the test and appropriately scaled to generate the unit interval measurement for the test.

The filtered phase difference signal data from the digitally programmable high pass filter 80 is also coupled to a digital-to analog converter (DAC) 84 for analog reconstruction of the phase difference error signal. DAC 84 converts the digital input at a 25.92 rate and coupled its output to a low pass filter (LPF) 86 for analog reconstruction of the phase difference signal.

DSP 44 further includes an accumulator for summing filtered phase difference signal data below the loop bandwidth of the PLL 36 to generate wander data. Wander measurements are made over a measurement band from about zero Hertz to about 10 Hertz. The low pass filter function in DSP 44 sets the low pass filter breakpoint for the wander measurement band. The phase difference signal data is summed over time intervals of 20 milliseconds, equivalent to a fifty Hertz repetition rate. The summed phase difference signal data for each 20 millisecond time interval is coupled to the system processor 42 where the summed 20 millisecond time interval data is summed together over a time measurement interval and appropriately scaled to generate time interval error. This error is essentially the error between the recovered clock from the input signal and the reference clock and is measured in units of time. The above implementation of the phase measurement apparatus 30 allows for simultaneous measurement of wander and jitter in a transport signal.

DSP 44 also performs an out-of-lock detection function by switching the loop filter coefficients to a set corresponding to a wider loop bandwidth and waiting a predetermined amount of time for PLL 36 to lock. If PLL 36 is still out-of-lock after the predetermined time period, DSP 44 responds by switching the loop filter coefficients to another set corresponding to an even wider loop bandwidth. The process repeats until PLL 36 locks.

DSP 44 further implements a frequency drift measurement function using the frequency update values for updating the frequency determining registers of the DDS 64. The frequency update values are differentiated and filtered over a bandwidth range from about zero to 0.5 Hertz. The frequency drift measurement results correspond to the frequency drift of a color subcarrier in a video signal embedded in the digital transport signal. The results can be coupled to the display processor for display or compared against a threshold frequency drift value for generating an alarm condition when the frequency drift line rate exceeds frequency drift standards for video.

Skilled workers will recognize that portions of this invention may be implemented differently from the implementations described above for a preferred embodiment. For example, the invention is usable with a wider variety of incoming signal frequencies, electrical and electro-optical signal types, measurement frequencies, and measurement bandwidths than those described herein for telecommunications networks. For example, this invention is suitable for measuring jitter and wander in data storage drives, video cable transmission networks, video recorders, and digitally coded transmission media. Therefore, the clock frequencies, filter breakpoints, digitization rates, and related parameters may be changed to adapt accordingly. Likewise, for measuring incoming signals within limited frequency ranges, the prescalers and the tracking oscillator may be eliminated. And, of course, depending on the measurement application, filtering employed by this invention may be most advantageously implemented with either analog or digital means.

It will be obvious to those having skill in the art that many changes may be made to the details of the above-described embodiment of this invention without departing from the underlying principles thereof. The scope of the present invention should, therefore, be determined only by the following claims.

What is claimed is:

1. An apparatus for measuring phase difference between a first signal having a first frequency and a second signal having a second frequency comprising:

a reference clock;

a phase-locked-loop having a loop bandwidth including;

a digital signal processor;

a digitally controlled frequency source generating in response to the reference clock and the digital signal processor the second signal having the second frequency;

a phase detector receiving the first and second signals and generating a phase difference signal proportional to a phase difference between the first and second frequencies with the phase difference signal having first frequency components representing the phase difference above the loop bandwidth of the phase-locked-loop; and an analog-to-digital converter digitizing the phase difference signal to generate phase difference signal data having the first frequency components of the phase difference signal with the phase difference signal data being coupled to the digital signal processor for processing the phase difference signal data to produce second frequency components representing the phase difference below the loop bandwidth of the phase-locked loop and providing frequency control data to the digitally controlled frequency source such that the first and second frequencies are in a phase-locked condition;

means for combining the phase difference signal data from the analog-to-digital converter and the processed phase difference signal data from the digital signal processor representing the first and second frequency components of the phase difference signal; and means for measuring the phase difference between the first and second signals.

2. The apparatus as recited in claim 1 wherein the digitally controlled frequency source comprises a direct digital synthesizer, a tracking oscillator, and a prescaler that cooperate to generate the second frequency when the first frequency is substantially greater than a frequency generated by the direct digital synthesizer.

3. The apparatus as recited in claim 1 wherein the digital signal processor executes at least one of a loop filter function, an integration function, a low pass filter function, a high pass filter function, an out-of-lock detection function and a frequency drift function.

4. The apparatus as recited in claim 3 wherein the loop filter function comprises a loop breakpoint that is programmable in a range from about 500 Hertz to about 1 Kilohertz.

5. The apparatus as recited in claim 3 wherein the frequency drift function comprises differentiating the frequency control data coupled to the digitally controlled frequency source and filtering in range from zero to 0.5 Hertz.

6. The apparatus as recited in claim 1 further comprising a clock recovery circuit that receives an incoming signal and produces the first signal, the incoming signal being of a type selected from a group consisting of a nonreturn-to-zero formatted signal, a return-to-zero formatted signal, a code-mark-inversion formatted signal, an alternate-mark-inversion formatted signal, and a clock input signal.

7. The apparatus as recited in claim 6 further comprising an incoming signal prescaler and in which the incoming signal has a signaling rate in a frequency range up to about 2.5 Gigabits per second.

8. The apparatus as recited in claim 1 wherein the combining means comprises a digital summing node.

9. The apparatus as recited in claim 8 wherein the digital summing node comprises an accumulator for summing the phase difference signal data representing the first and second frequency components of the phase difference signal.

10. The apparatus as recited in claim 9 wherein the digital summing node performs a RMS function over a selected time interval on the phase difference signal data representing the first and second frequency components of the phase difference signal.

11. The apparatus as recited in claim 1 wherein the measuring means comprises:

means for implementing selected frequency bands for measuring the phase difference; and means for measuring peak-to-peak and RMS phase difference data amplitudes for at least one of an amount of jitter and filtered phase difference values over time of the second frequency components for an amount of wander.

12. The apparatus as recited in claim 11 wherein the frequency bands implementing means comprises serially coupled digitally programmable low and high pass filters implementing low and high pass filter functions and coupled to receive the combined phase difference signal data representing the first and second frequency components of the phase difference signal from the combining means.

13. The apparatus as recited in claim 11 wherein the measuring means comprises a processor having an accumulator for storing minimum and maximum peak-to-peak values of the filtered phase difference data amplitudes over a first time interval and performing a RMS function on the phase difference data amplitudes over the first time interval for generating RMS values and summing filtered phase difference data amplitudes of the second frequency components over a second time interval from the frequency band implementing means.

14. The apparatus as recited in claim 13 further comprising means for generating a wander measurement output as a function of time and a jitter measurement output as a function of unit intervals.

15. The apparatus as recited in claim 14 wherein the generating means comprises the digital signal processor.

16. The apparatus as recited in claim 14 wherein the generating means comprises a system processor.

17. The apparatus as recited in claim 12 wherein the digitally programmable high pass filter function further comprises a breakpoint that is programmable in a range from about 0.1 Hertz to about 250 Kilohertz.

18. The apparatus as recited in claim 17 wherein the digitally programmable high pass filter function breakpoint is continuously programmable in a range from about 0.1 Hertz to about 20 Hertz and selectively programmable in a range from about 100 Hertz to about 250 Kilohertz.

19. The apparatus as recited in claim 17 wherein the digitally programmable high pass filter function breakpoint is selectively programmable in steps from about 0.1 Hertz to about 250 Kilohertz.

20. The apparatus as recited in claim 12 wherein the digitally programmable low pass filter function comprises a breakpoint that is programmable in the range from about 10 Hertz to about 5 Megahertz.

21. The apparatus as recited in claim 20 wherein the digitally programmable low pass filter further includes a decimating digital filter having a predetermined low pass breakpoint.

22. The apparatus as recited in claim 21 wherein the decimating digital filter includes at least a boxcar averaging decimating digital filter and a finite impulse response filter.

23. The apparatus as recited in claim 11 wherein the amount of wander is measured in a wander band and the amount of jitter is measured in at least one of a subband, a wideband, a fullband, and a highband.

24. The apparatus as recited in claim 23 wherein the wander band spans a frequency range from about zero Hertz to about 10 Hertz.

25. The apparatus as recited in claim 23 wherein the subband spans a frequency range from about 0.1 Hertz to about 1 Kilohertz.

26. The apparatus as recited in claim 23 wherein the wideband spans a frequency range from about 10 Hertz to about 5 Megahertz.

27. The apparatus as recited in claim 23 wherein the fullband spans a frequency range from about 0.1 Hertz to about 5 Megahertz.

28. The apparatus as recited in claim 23 wherein the highband spans a frequency range from about 700 Hertz to about 5 Megahertz.

29. The apparatus as recited in claim 11 wherein the measuring means includes the digital signal processor executing a loop filter function and an integration function on the phase difference signal data and low and high pass filter functions on the processed phase difference signal data and having an accumulator for summing filtered phase difference data amplitudes of the second frequency components over a first time interval for the amount of wander and a processor having an accumulator for storing minimum and maximum peak-to-peak values of the filtered phase difference data amplitudes over a second time interval and performing a RMS function on the phase difference data amplitudes over the second time interval for generating RMS values from the frequency band implementing means for at least one of the amount of jitter.

30. The apparatus as recited in claim 29 wherein the digital signal processor loop filter function comprising a loop breakpoint that is programmable in a range from about 500 Hertz to about 1 Kilohertz.

31. The apparatus as recited in claim 29 wherein the digital signal processor low pass filter function includes a breakpoint that is programmable from a range of about 10 Hertz to about 20 Hertz.

32. The apparatus as recited in claim 29 wherein the digital signal processor highpass filter function includes a breakpoint that is continuously programmable from a range of about 0.1 Hertz to about 20 Hertz.

33. The apparatus as recited in claim 29 wherein the digital signal processor high pass filter function includes a breakpoint that is selectively programmable from a range of about 0.1 Hertz to about 20 Hertz.

34. The apparatus as recited in claim 29 wherein the amount of wander measurable on the first signal is in a range from about zero milliseconds to about ±10 milliseconds.

35. The apparatus as recited in claim 29 wherein the amount of jitter measurable on the first signal is in a range from about zero unit intervals to about ±256 unit intervals.

36. The apparatus as recited in claim 29 further comprising means for generating a wander measurement output as a function of time and a jitter measurement output as a function of unit intervals.

37. The apparatus as recited in claim 36 wherein the generating means comprises the digital signal processor.

38. The apparatus as recited in claim 37 wherein the generating means comprises a system processor.

39. The apparatus as recited in claim 29 wherein the amount of wander is measured in a wander band and the amount of jitter is measured in at least one of a subband, a wideband, a fullband, and a highband.

40. The apparatus as recited in claim 39 wherein the wander band spans a frequency range from about zero Hertz to about 10 Hertz.

41. The apparatus as recited in claim 39 wherein the subband spans a frequency range from about 0.1 Hertz to about 1 Kilohertz.

42. The apparatus as recited in claim 39 wherein the wideband spans a frequency range from about 10 Hertz to about 5 Megahertz.

43. The apparatus as recited in claim 39 wherein the fullband spans a frequency range from about 0.1 Hertz to about 5 Megahertz.

44. The apparatus as recited in claim 39 wherein the highband spans a frequency range from about 700 to about 5 Megahertz.

45. The apparatus as recited in claim 11 wherein the frequency bands implementing means comprises digitally programmable low and high pass filters implementing low and high pass filter functions with the low pass filter coupled to receive the phase difference signal data from the analog-to-digital converter representing the first frequency components of the phase difference signal and the high pass filter is coupled to receive the combined phase difference signal data representing the first and second frequency components of the phase difference signal from the combining means.

46. The apparatus as recited in claim 45 wherein the digitally programmable low pass filter includes a low pass breakpoint that is programmable in a range from about 40 Kilohertz to about 5 MHZ.

47. The apparatus as recited in claim 46 wherein the digitally programmable low pass filter further includes a decimating digital filter.

48. The apparatus as recited in claim 47 wherein the decimating digital filter includes at least a boxcar averaging decimating digital filter and a finite impulse response filter.

49. The apparatus as recited in claim 45 wherein the digitally programmable high pass filter function includes a breakpoint that is programmable in a range from about 100 Hertz to about 250 Kilohertz.

50. An apparatus for measuring at least one of an amount of jitter and an amount of wander present on a first signal having a first frequency, comprising:

a reference clock;

a phase-locked-loop having a loop bandwidth including;

a digital signal processor executing at least one of a loop filter function, an integration function, a low pass filter function, a high pass filter function, and an out-of-lock detection function;

a digitally controlled frequency source generating in response to the reference clock and the digital signal processor a second signal having a second frequency;

a phase detector receiving the first and second signals and generating a phase difference signal proportional to a phase difference between the first and second frequencies with the phase difference signal having first frequency components representing the phase difference above the loop bandwidth of the phase-locked-loop; and an analog-to-digital converter digitizing the phase difference signal to generate phase difference signal data having the first frequency components of the phase difference signal with the phase difference signal data being coupled to the digital signal processor for executing the loop filter and integration functions on the phase difference signal data to produce second frequency components representing the phase difference below the loop bandwidth of the phase-locked loop and providing frequency control data to the digitally controlled frequency source such that the first and second frequencies are in a phase-locked condition, the digital signal processor further executing the low and high pass filter functions on the integrated phase difference signal data;

a digitally programmable low pass filter coupled to the analog-to-digital converter for implementing a low pass filter function on the phase difference signal data representing the first frequency components;

a summation circuit for summing the low pass filtered phase difference signal data from the digitally programmable low pass filter and the filtered integrated phase difference signal data from the digital signal processor;

a digitally programmable high pass filter coupled to receive the output of the summing circuit for implementing a high pass filter function on the summed phase difference signal data; and means for measuring at least one of the amount of jitter and the amount of wander on the first signal.

51. The apparatus as recited in claim 50 further including a clock recovery circuit that receives an incoming signal and produces the first signal, the incoming signal being of a type selected from a group consisting of a nonreturn-to-zero formatted signal, a return-to-zero formatted signal, a code-mark-inversion formatted signal, an alternate-mark-inversion formatted signal, and a clock input signal.

52. The apparatus as recited in claim 51 further including an incoming signal prescaler and in which the incoming signal has a signaling rate in a frequency range up to about 2.5 Gigabits per second.

53. The apparatus as recited in claim 50 in which the digitally controlled frequency source includes a direct digital synthesizer, a tracking oscillator, and a prescaler that cooperate to generate the second frequency when the first frequency is substantially greater than a frequency generated by the direct digital synthesizer.

54. The apparatus as recited in claim 50 in which the digital signal processor further comprises executing a frequency drift function.

55. The apparatus as recited in claim 54 in which the frequency drift function comprises differentiating the frequency control data coupled to the digitally controlled frequency source and filtering in a range from zero to 0.5 Hertz.

56. The apparatus as recited in claim 50 in which the measuring means includes the digital signal processor having an accumulator for summing filtered phase difference data amplitudes of the second frequency components over a first time interval for the amount of wander and a processor having an accumulator for storing minimum and maximum peak-to-peak values of the filtered phase difference data amplitudes over a second time interval and performing a RMS function on the phase difference data amplitudes over the second time interval for generating RMS values of the phase difference signal data from the digitally programmable high pass filter for at least one of the amount of jitter.

57. The apparatus as recited in claim 56 further including means for generating a wander measurement output as a function of time and a jitter measurement output as a function of unit intervals.

58. The apparatus as recited in claim 57 wherein the generating means comprises the digital signal processor.

59. The apparatus as recited in claim 57 wherein the generating means comprises a system processor.

60. The apparatus as recited in claim 50 in which the digital signal processor high pass filter function includes a breakpoint that is continuously programmable in a range from about 0.1 Hertz to about 20 Hertz.

61. The apparatus as recited in claim 50 in which the digital signal processor high pass filter function includes a breakpoint that is selectively programmable from a range of about 0.1 Hertz to about 20 Hertz.

62. The apparatus as recited in claim 50 in which the digital signal processor low pass filter function includes a breakpoint that is programmable in the range from about 10 Hertz to about 20 Hertz.

63. The apparatus as recited in claim 50 in which the digital signal processor loop filter function includes a loop breakpoint that is programmable in a range from about 500 Hertz to about 1 Kilohertz.

64. The apparatus as recited in claim 50 in which the digitally programmable high pass filter function further includes a breakpoint that is programmable in a range from about 100 Hertz to about 250 Kilohertz.

65. The apparatus as recited in claim 50 in which the digitally programmable low pass filter function further includes a decimating digital filter implementing a finite impulse response filter function having a breakpoint that is programmable in a range from about 40 Kilohertz to about 5 Megahertz.

66. The apparatus as recited in claim 65 in which the decimating digital filter includes at least a boxcar averaging decimating digital filter and a finite impulse response filter.

67. The apparatus as recited in claim 50 in which the amount of wander is measured in a wander band and the amount of jitter is simultaneously measured in at least one of a subband, a wideband, a fullband, and a highband.

68. The apparatus as recited in claim 67 in which the wander band spans a frequency range from about zero Hertz to about 10 Hertz.

69. The apparatus as recited in claim 67 in which the subband spans a frequency range from about 0.1 Hertz to about 1 Kilohertz.

70. The apparatus as recited in claim 67 in which the wideband spans a frequency range from about 10 Hertz to about 5 Megahertz.

71. The apparatus as recited in claim 67 in which the fullband spans a frequency range from about 0.1 Hertz to about 5 Megahertz.

72. The apparatus as recited in claim 67 in which the highband spans a frequency range from about 700 to about 5 Megahertz.

73. A method for measuring a phase difference between a first signal having a first frequency and a second signal having a second frequency comprising the steps of:

receiving the first signal;

generating the second signal having the second frequency with a digitally controlled frequency source being a part of a phase-locked-loop having a loop bandwidth;

producing with a phase detector a phase difference signal indicative of a phase difference between the first and second frequencies with the phase difference signal having first frequency components representing the phase difference above the loop bandwidth of the phase-locked-loop;

digitizing the phase difference signal to generate phase difference signal data having the first frequency components of the phase difference signal;

processing digitally the phase difference signal data to produce second frequency components below the loop bandwidth of the phase-locked-loop and provide frequency correction data to the digitally controlled frequency source such that the first and second frequencies are in a phase-locked condition;

combining the phase difference signal data representing the first frequency components above the loop bandwidth with the processed second frequency components below the loop bandwidth; and processing the combined phase difference signal data to measure the phase difference between the first signal and the second signal.

74. The method of claim 73 further including receiving an incoming signal and recovering the first signal from the incoming signal.

75. The method of claim 74 in which the recovering step further includes prescaling the incoming signal.

76. The method of claim 75 in which the incoming signal is a digitally formatted signal having a signaling rate in a frequency range up to about 2.5 Gigabits per second.

77. The method of claim 73 in which the generating step further includes generating in response to the frequency correction data a submultiple of the second frequency and producing the second signal by tracking an oscillator to a multiple of the submultiple of the second frequency.

78. The method of claim 73 in which the digitally processing step further includes at least one of loop filtering the phase difference signal data, integrating the phase difference signal data, low pass filtering the phase difference signal data, high pass filtering the phase difference signal data, detecting in the phase difference signal data an out-of-lock condition, and determining frequency drift.

79. The method of claim 78 in which the frequency drift determining step includes the steps of differentiating the frequency correction data and filtering the differentiated data over a range from about zero Hertz to about 0.5 Hertz.

80. The method of claim 78 in which the loop filtering step further includes setting digitally a low pass breakpoint in a range from about 500 Hertz to about 1 Kilohertz.

81. The method of claim 73 in which the combining step further includes summing the phase difference signal data representing the first and second frequency components of the phase difference signal.

82. The method of claim 73 in which the processing step further includes:
implementing selected frequency bands for measuring the phase difference; and
measuring peak-to-peak and RMS phase difference data amplitudes over a first time interval for at least one of an amount of jitter and filtered phase difference data amplitudes of the second frequency components over a second time interval for an amount of wander.

83. The method of claim 82 in which the implementing step further includes implementing low and high pass filter functions using low and high pass filters.

84. The method of claim 83 in which the high pass filtering function further includes setting digitally a high pass breakpoint in a range from about 0.1 Hertz to about 250 Kilohertz.

85. The method of claim 84 in which the digitally setting step includes continuously setting the high pass filter function in a range from about 0.1 Hertz to about 20 Hertz and selectively setting the high pass filter function in ranges of about 100 Hertz to about 250 Kilohertz.

86. The method of claim 84 in which the digitally setting step includes setting the high pass filter function in steps from about 0.1 Hertz to about 250 Kilohertz.

87. The method of claim 83 in which the low pass filtering function further includes digitally setting a boxcar averaging decimating digital filter and a finite impulse response filter.

88. The method of claim 82 in which the measuring step further includes storing minimum and maximum peak-to-peak values of filtered phase difference data amplitudes over the first time interval and summing and executing a RMS function on and filtered phase difference data amplitudes over the first time interval for generating RMS values and summing filtered phase difference data amplitudes of the second frequency components over the second time interval from the frequency band implementing means.

89. The method of claim 88 in which the measuring step further includes generating a wander measurement output as a function of time and a jitter measurement output as a function of unit intervals.

90. The method of claim 83 further including the step of filtering digitally at predetermined low and high pass breakpoints the combined phase difference signal data to measure the amount of wander and at least one of the amount of jitter on the first signal.

91. The method of claim 90 in which the filtering of the combined phase difference signal data step further includes measuring the amount of wander present on the first signal in a wander band having a frequency range from about zero Hertz to about 10 Hertz.

92. The method of claim 90 in which the filtering of the combined phase difference signal data step further includes measuring the amount of jitter present on the first signal in a subband having a frequency range from about 0.1 Hertz to about 1 Kilohertz.

93. The method of claim 90 in which the filtering of the combined phase difference signal data step further includes measuring the amount of jitter present on the first signal in a wideband having a frequency range from about 10 Hertz to about 5 Megahertz.

94. The method of claim 90 in which the filtering of the combined phase difference signal data step further includes measuring the amount of jitter present on the first signal in a fullband having a frequency range from about 0.1 Hertz to about 5 Megahertz.

95. The method of claim 90 in which the filtering of the combined phase difference signal data step further includes measuring the amount of jitter present on the first signal in a highband having a frequency range from about 700 to about 5 Megahertz.

96. The method of claim 73 in which the processing digitally step further includes at least one of loop filtering the phase difference signal data, integrating the phase difference signal data, low pass filtering the phase difference signal data, high pass filtering the phase difference signal data, detecting in the phase difference signal data an out-of-lock condition, and summing filtered phase difference data amplitudes of the second frequency components over a first time interval for an amount of wander.

97. The method of claim 96 in which he loop filtering step further includes setting digitally a low pass breakpoint in a range from about 500 Hertz to about 1 Kilohertz.

98. The method of claim 96 in which the low and high pass filtering step further includes implementing low and high pass filter functions.

99. The method of claim 98 in which the low and high pass filtering function step further includes measuring the amount of wander present on the first signal in a wander band having a frequency range from about zero Hertz to about 10 Hertz.

100. The method of claim 99 further including the step of generating a wander measurement output as a function of time.

101. The method of claim 98 in which the low pass filter function further includes setting digitally a low pass breakpoint in a range from about 10 Hertz to 20 Hertz.

102. The method of claim 98 in which the high pass filter function further includes setting digitally a high pass breakpoint in a range from about 0.1 Hertz to about 20 Hertz.

103. The method of claim 102 in which the digitally setting step includes continuously setting the high pass filter function in a range from about 0.1 Hertz to about 20 Hertz.

104. The method of claim 102 in which the digitally setting step includes setting the high pass filter function in steps from about 0.1 Hertz to about 20 Hertz.

105. The method of claim 96 further including the step of storing the minimum and maximum peak-to-peak-values of phase difference data amplitudes over a second time interval and summing and executing a RMS function on and filtered phase difference data amplitudes over the second time interval for generating RMS values from the frequency band implementing means.

106. The method of claim 105 further including the step of generating a jitter measurement output as a function of unit intervals.

107. The method of claim 96 further including the step of filtering digitally at predetermined low and high pass breakpoints the combined phase difference signal data to measure at least one of the amount of jitter on the first signal.

108. The method of claim 107 in which the filtering of the combined phase difference signal data step further includes measuring the amount of jitter present on the first signal in a subband having a frequency range from about 0.1 Hertz to about 1 Kilohertz.

109. The method of claim 107 in which the filtering of the combined phase difference signal data step further includes measuring the amount of jitter present on the first signal in a wideband having a frequency range from about 10 Hertz to about 5 Megahertz.

110. The method of claim 107 in which the filtering of the combined phase difference signal data step further includes measuring the amount of jitter present on the first signal in a fullband having a frequency range from about 0.1 Hertz to about 5 Megahertz.

111. The method of claim 107 in which the filtering of the combined phase difference signal data step further includes measuring the amount of jitter present on the first signal in a highband having a frequency range from about 700 to about 5 Megahertz.

\* \* \* \* \*